US010895215B2

(12) United States Patent
Yamaguchi et al.

(10) Patent No.: US 10,895,215 B2
(45) Date of Patent: Jan. 19, 2021

(54) CONTROL SYSTEM FOR PRE-MIXTURE COMPRESSION-IGNITION ENGINE

(71) Applicant: Mazda Motor Corporation, Hiroshima (JP)

(72) Inventors: Naohiro Yamaguchi, Hiroshima (JP); Hiroki Morimoto, Hiroshima (JP); Toru Miyamoto, Hiroshima (JP); Akira Noomo, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 74 days.

(21) Appl. No.: 16/107,630

(22) Filed: Aug. 21, 2018

(65) Prior Publication Data
US 2019/0063361 A1  Feb. 28, 2019

(30) Foreign Application Priority Data
Aug. 24, 2017  (JP) .................................. 2017-160702

(51) Int. Cl.
*F02D 41/30* (2006.01)
*F01B 11/02* (2006.01)
(Continued)

(52) U.S. Cl.
CPC ............ *F02D 41/3041* (2013.01); *F01B 1/10* (2013.01); *F01B 11/02* (2013.01); *F02B 1/14* (2013.01);
(Continued)

(58) Field of Classification Search
CPC ............ F02D 41/3041; F02D 41/3047; F02D 41/3029; F02D 41/402; F02D 41/3076;
(Continued)

(56) References Cited

U.S. PATENT DOCUMENTS 5,435,283 A * 7/1995 Zehr ..................... F02B 31/082
123/188.14
5,463,995 A * 11/1995 Sakai ..................... F01L 1/267
123/308
(Continued)

FOREIGN PATENT DOCUMENTS

JP   2005016407 A *  1/2005  ......... F02D 41/0065
JP   2007315383 A    12/2007
(Continued)

*Primary Examiner* — David Hamaoui
(74) *Attorney, Agent, or Firm* — Alleman Hall Creasman & Tuttle LLP

(57) ABSTRACT

A control system for a pre-mixture compression-ignition engine is provided, configured such that in a first combustion mode, the control unit controls the fuel injection valve to have a fuel amount within a mixture gas in an outer circumferential portion of the combustion chamber larger than in the center portion, the swirl generating part to generate a swirl flow in the outer circumferential portion, and the spark plug to ignite the mixture gas in the center portion. In a second combustion mode, the control unit controls the fuel injection valve to start a fuel injection on intake stroke so that the mixture gas is formed in the entire combustion chamber, the swirl generating part so that a swirl flow becomes weaker than in the first combustion mode, and the spark plug to ignite the mixture gas before CTDC.

6 Claims, 18 Drawing Sheets

(51) Int. Cl.
  *F01B 1/10* (2006.01)
  *F02D 41/40* (2006.01)
  *F02B 31/08* (2006.01)
  *F02B 23/10* (2006.01)
  *F02B 1/14* (2006.01)
  *F02B 11/00* (2006.01)
  *F02B 23/06* (2006.01)
  *F02D 41/00* (2006.01)
  *F02B 31/00* (2006.01)

(52) U.S. Cl.
  CPC .......... *F02B 11/00* (2013.01); *F02B 23/0624* (2013.01); *F02B 23/10* (2013.01); *F02B 23/101* (2013.01); *F02B 31/085* (2013.01); *F02D 41/3029* (2013.01); *F02D 41/3047* (2013.01); *F02D 41/3076* (2013.01); *F02D 41/402* (2013.01); *F02B 2023/108* (2013.01); *F02B 2031/006* (2013.01); *F02D 2041/0015* (2013.01)

(58) Field of Classification Search
  CPC ............. F02D 41/0002; F02D 41/3035; F02D 41/3064; F02D 41/401; F02D 2041/0015; F02D 9/10; F01B 11/02; F01B 1/10; F01B 31/085; F01B 23/101; F01B 1/14; F01B 11/00; F01B 23/0624; F01B 23/10; F01B 2031/006; F01B 2023/108; F01B 31/06; F02P 5/15
  See application file for complete search history.

(56) References Cited

U.S. PATENT DOCUMENTS

| | | | |
|---|---|---|---|
| 6,968,825 B2* | 11/2005 | Hitomi | F01L 1/053 123/406.11 |
| 10,247,156 B2* | 4/2019 | Sakai | F02M 61/162 |
| 10,487,720 B2* | 11/2019 | Inoue | F02D 41/3041 |
| 10,502,147 B2* | 12/2019 | Inoue | F02D 13/0265 |
| 10,648,422 B2* | 5/2020 | Inoue | F02D 41/3041 |
| 10,677,185 B2* | 6/2020 | Inoue | F02D 23/02 |
| 10,697,391 B2* | 6/2020 | Inoue | F02D 41/0052 |
| 2018/0334989 A1* | 11/2018 | Inoue | F02D 41/0065 |
| 2018/0334998 A1* | 11/2018 | Inoue | F02D 13/0261 |
| 2019/0145306 A1* | 5/2019 | Tanaka | F02B 1/14 123/299 |
| 2019/0145338 A1* | 5/2019 | Tanaka | F02D 41/3064 60/285 |
| 2019/0145367 A1* | 5/2019 | Tanaka | F02M 21/0275 123/470 |

FOREIGN PATENT DOCUMENTS

| | | | | |
|---|---|---|---|---|
| JP | 4082292 B2 | 4/2008 | | |
| JP | 20100001833 A | 1/2010 | | |
| JP | 2011021553 A | 2/2011 | | |
| JP | 2012188949 A | 10/2012 | | |
| JP | 2012241588 A | 12/2012 | | |
| JP | 2012241590 A | * 12/2012 | ........... | F02D 41/402 |
| JP | 2013113175 A | 6/2013 | | |
| JP | 5447435 B2 | 3/2014 | | |

* cited by examiner

| COMBUSTION MODE | COMBUSTION FORM | SCV | ENGINE OPERATING RANGE | CORRESPONDING RANGE OF FIG.15 |
|---|---|---|---|---|
| 1ST COMBUSTION MODE | SI COMBUSTION + CI COMBUSTION | CLOSED | 1ST SPEED RANGE | 603 |
| 2ND COMBUSTION MODE | SI COMBUSTION | OPEN | 2ND SPEED RANGE | 605 |

FIG. 17

CONTROL SYSTEM FOR PRE-MIXTURE COMPRESSION-IGNITION ENGINE

TECHNICAL FIELD

The present disclosure relates to a control system for a pre-mixture compression-ignition engine.

BACKGROUND OF THE DISCLOSURE

JP4082292B discloses an engine in which a mixture gas inside a combustion chamber is combusted by compression ignition within a given operating range of the engine in which an engine load and an engine speed are low. In this engine, the mixture gas combusts by spark-ignition within an operating range in which the engine load is higher than the given operating range and an operating range in which the engine speed is higher than the given operating range. In this engine, also within the given operating range, a spark plug performs the spark-ignition near a top dead center of compression stroke to stimulate compression ignition of the mixture gas.

JP5447435B discloses an engine in which the mixture gas inside a combustion chamber is combusted by compression ignition within a high load range of the engine. In this engine, within a high speed segment of the high load range, a fuel injection is performed with a small amount of fuel between a first-stage injection and a second-stage injection in which the mixture gas for CI combustion is formed, in order to assist the ignition. This fuel injected for the ignition assist forms rich mixture gas near a spark plug. The spark plug ignites the rich mixture gas to form a flame, which causes the mixture gas formed by the first-stage injection to ignite by compression, and then the mixture gas formed by the second-stage injection performed at the same time as the compression ignition also ignites by compression.

Incidentally, combustion caused by compression ignition accompanies relatively loud combustion noise. For example, if such a combustion is to be performed while an engine is operating within a high load range including a full load, the combustion noise may exceed an allowable value.

SUMMARY OF THE DISCLOSURE

The present disclosure is made in view of the above situations and aims to perform combustion by compression ignition while reducing combustion noise of a pre-mixture compression-ignition engine below an allowable value.

The present inventors considered a combustion form in which SI (Spark Ignition) combustion and CI (Compression Ignition) combustion are combined. The SI combustion is combustion accompanying flame propagation which starts by forcibly igniting the mixture gas inside a combustion chamber. The CI combustion is combustion which starts by the mixture gas inside the combustion chamber self-igniting by being compressed. In the combustion mode combining the SI combustion and the CI combustion, the mixture gas inside the combustion chamber is forcibly ignited to start its combustion through flame propagation, and heat generated by this SI combustion and pressure increase thereby cause combustion of unburned mixture gas inside the combustion chamber by compression ignition. Hereinafter, this combustion mode is referred to as "SPCCI (SPark Controlled Compression Ignition) combustion."

In the combustion caused by compression ignition, the timing of the compression ignition changes greatly if the temperature inside the combustion chamber varies before the compression starts. In this regard, the variation in the temperature inside the combustion chamber before the compression starts can be reduced by adjusting the heat generation amount in the SI combustion. For example, by controlling the ignition timing to adjust the start timing of the SI combustion according to the temperature inside the combustion chamber before the compression starts, the timing of compression ignition is controlled. The SPCCI combustion controls the CI combustion with the SI combustion.

The SI combustion through flame propagation causes a gentler pressure increase compared to the CI combustion, thus reducing the combustion noise. Further, the CI combustion shortens the combustion period compared to the SI combustion, which is advantageous in improving fuel efficiency.

When the engine is operating within a high load range, a fuel injection amount increases and the temperature inside the combustion chamber also rises. Therefore, even if the SPCCI combustion is to be performed, the CI combustion may occur simultaneously to the start of the SI combustion. In the SPCCI combustion, if the SI combustion is not sufficiently performed, combustion noise may increase or combustion temperature may rise excessively to generate $NO_x$.

Therefore, the present inventors configured the SPCCI combustion so that when the engine is operating within the high load range, the mixture gas inside the combustion chamber is stratified so that sufficient SI combustion is performed.

Further, when an engine speed is high, the time length for the crank angle to change 1° becomes short, which means the time length for the mixture gas to be formed after the fuel is injected also becomes short, therefore it becomes difficult to stratify the mixture gas as described above. When the engine is operating within a high speed segment of the high load range, it becomes difficult to perform the SPCCI combustion described above.

Therefore, in the present disclosure, the SPCCI combustion is performed within a low speed segment of the high load range by stratifying the mixture gas inside the combustion chamber, while the SI combustion is performed within the high speed segment of the high load range by forming the mixture gas inside the combustion chamber to be homogeneous or substantially homogeneous.

Specifically, according to one aspect of the present disclosure, a control system for a pre-mixture compression-ignition engine is provided. The device includes an engine formed with a combustion chamber and provided with an intake port opening into the combustion chamber, a spark plug disposed in a center portion of the combustion chamber, a fuel injection valve disposed to be oriented into the combustion chamber, a swirl generating part configured to generate a swirl flow in a circumferential direction in an outer circumferential portion of the combustion chamber located around the center portion, by a flow of intake air from the intake port, and a control unit connected to the spark plug, the fuel injection valve, and the swirl generating part and configured to output a control signal to the spark plug, the fuel injection valve, and the swirl generating part, respectively. The control unit includes a processor configured to execute an operating range determining module to determine an operating range of the engine, and a combustion mode selecting module to select one of a first combustion mode in which SI combustion where a mixture gas formed in the combustion chamber combusts by flame propagation starts and CI combustion where unburned mixture gas combusts by compression ignition is then performed, and a second combustion mode in which only the SI combustion is performed by the flame propagation.

When the combustion mode selecting module selects the first combustion mode, the control signal is outputted to the fuel injection valve to have a fuel amount within the mixture gas in the outer circumferential portion larger than a fuel amount within the mixture gas in the center portion so that a fuel concentration of the mixture gas in the outer circumferential portion of the combustion chamber becomes higher than a fuel concentration of the mixture gas in the center portion, the control signal is outputted to the swirl generating part so as to generate a swirl flow in the outer circumferential portion, and the control signal is outputted to the spark plug so as to ignite the mixture gas in the center portion. When the combustion mode selecting module selects the second combustion mode, the control signal is outputted to the fuel injection valve so as to start the fuel injection on intake stroke so that the mixture gas is formed in the entire combustion chamber, the control signal is outputted to the swirl generating part so that the swirl flow becomes weaker than when the first combustion mode is selected, and the control signal is outputted to the spark plug so as to ignite the mixture gas before a top dead center of compression stroke.

When the operating range determining module determines that an engine load is in a high load range higher than a given load and an engine speed is in a first speed range lower than a given speed, the combustion mode selecting module selects the first combustion mode. When the operating range determining module determines that the engine load is in the high load range and the engine speed is in a second speed range higher than the given speed, the combustion mode selecting module selects the second combustion mode.

Here, the "engine" may be a four-stroke engine which is operated by the combustion chamber repeating intake stroke, compression stroke, expansion stroke, and exhaust stroke. The "high load range" may be, for example, a high load range including a full load, in the operating range defined by the engine speed and load. Further, the "second speed range" may be a high speed range when the entire operating range of the engine is divided into two, a low speed range and the high speed range, or may be a high speed range when the entire operating range of the engine is divided into three, a low speed range, a medium speed range, and the high speed range. The "first speed range" may be a low speed range when the entire operating range of the engine is divided into two, the low speed range and a high speed range, or may be a medium speed range, a low speed range, or medium and low speed ranges when the entire operating range of the engine is divided into three, the low speed range, the medium speed range, and the high speed range.

According to this configuration, when the engine operates in the first speed range in the high load range, the fuel concentration of the mixture gas in the outer circumferential portion of the combustion chamber is made to be higher than the fuel concentration of the mixture gas in the center portion, and the fuel amount within the mixture gas in the outer circumferential portion is made to be larger than the fuel amount within the mixture gas in the center portion. For example, a plurality of fuel injections may be performed in a period of the compression stroke. The temperature of the outer circumferential portion of the combustion chamber is lowered by latent heat of vaporization of the fuel. Note that the fuel concentration and the fuel amount used herein are a fuel concentration and a fuel amount at the time of ignition.

Since the spark plug is disposed in the center portion of the combustion chamber, it ignites the mixture gas in the center portion. Due to the ignition of the spark plug, the mixture gas starts the SI combustion by flame propagation.

Heat generation and a pressure increase by this SI combustion cause the combustion of unburned mixture gas in the outer circumferential portion of the combustion chamber by the compression ignition. Since the temperature of the outer circumferential portion is lowered, it is avoided that the CI combustion starts immediately after the mixture gas is spark-ignited. The SI combustion is sufficiently performed until the CI combustion starts. As a result, a generation of combustion noise is reduced and, since the combustion temperature does not become excessively high, generation of $NO_x$ is also reduced.

Further, since the temperature in the outer circumferential portion is low, the CI combustion becomes slower and the generation of the combustion noise is reduced. Moreover, since the combustion period is shortened by the CI combustion, within the high load range, torque improves and also thermal efficiency improves. Thus, this engine is improved in fuel efficiency while avoiding combustion noise within the high load range.

When the engine operates within the second speed range in which the speed is higher than the first speed range, the fuel injection is performed at a timing advanced with respect to an injection start timing within the first speed range. Since the fuel injection start is early, a homogeneous or substantially homogeneous mixture gas can be formed. By securing an evaporation time of the fuel as long as possible within the second speed range in which the speed is high, unburned fuel loss is reduced and soot generation is reduced.

Moreover, when the engine operates within the second speed range, the mixture gas starts the SI combustion by the flame propagation due to the ignition of the spark plug before the top dead center of compression stroke. By the SI combustion of the homogeneous mixture gas, the torque increases within the second speed range in the high load range.

When the swirl flow with a given strength, i.e., a relatively strong swirl flow is generated in the combustion chamber, the swirl flow has a strong stream in the outer circumferential portion of the combustion chamber. On the other hand, the swirl flow has a relatively weak stream in the center portion, and by a whirling flow caused by a velocity gradient in a boundary between the center portion and the outer circumferential portion, the center portion has higher turbulence energy.

Here, as definitions of the center portion and the outer circumferential portion of the combustion chamber, the outer circumferential portion may be defined as a portion with the strong swirl flow whereas the center portion may be defined as a portion with the weak swirl flow.

When the spark plug ignites the mixture gas of the center portion, the SI combustion becomes stable by the high turbulence energy and the speed of the combustion increases.

The flame of the SI combustion propagates in a circumferential direction along the strong swirl flow inside the combustion chamber. Then the temperature and pressure of the mixture gas are increased in a given position in the circumferential direction in the outer circumferential portion of the combustion chamber, the unburned mixture gas is ignited by compression, and the CI combustion is started. By generating the strong swirl flow in the SPCCI combustion, the SI combustion is stabilized and the CI combustion is made to be appropriate. Further, variation in the torque between cycles is reduced.

Within the second speed range in the high load range where the engine performs the SI combustion, since the speed is relatively high, a large amount of air needs to be introduced into the combustion chamber in a short time. Strengthening the swirl flow when the engine speed is high causes a pump loss to be increased. Within the second speed range, by making the swirl flow weaker than that within the first speed range, an intake charge amount is secured and the fuel efficiency is improved by the reduction of the pump loss. Note that within the second speed range, the swirl flow may not be generated.

The intake port may be comprised of a first intake port and a second intake port opening to one combustion chamber, a first intake passage is connected to the first intake port and a second intake passage is connected to the second intake port. The swirl generating part may be disposed in the second intake passage and have a swirl control valve configured to throttle the second intake passage. When the operating range determining module determines that the operating range of the engine is within the first speed range, the control unit may output the control signal to the swirl control valve to have a smaller opening than when the operating range of the engine is determined to be within the second speed range.

According to this, by the swirl control valve throttling the second intake passage within the first speed range in the high load range, the strong swirl flow is generated inside the combustion chamber. On the other hand, within the second speed range in the high load range, by not throttling the second intake passage, the swirl flow is weakened or does not occur.

When the operating range determining module determines that the operating range of the engine is within the first speed range, the control unit may output the control signal to the fuel injection valve so that a first injection is performed in a period from the intake stroke to an early half of the compression stroke so as to form the mixture gas for the CI combustion in the outer circumferential portion, and a second injection is performed on the compression stroke so as to form mixture gas for the SI combustion in the center portion.

Here, the "early half" of the compression stroke may be an early half of the compression stroke when dividing the compression stroke into two.

Thus, the mixture gas is stratified in the center portion and the outer circumferential portion of the combustion chamber.

According to another aspect of the present disclosure, a control system for a pre-mixture compression-ignition engine is provided. The control system includes an engine formed with a combustion chamber and provided with a first intake port and a second intake port opening into the combustion chamber, the first intake port connecting to a first intake passage, the second intake port connecting to a second intake passage, a spark plug disposed in a center portion of the combustion chamber, a fuel injection valve disposed to be oriented into the combustion chamber, a swirl control valve disposed in the second intake passage and configured to generate a swirl flow in a circumferential direction in an outer circumferential portion of the combustion chamber located around the center portion, by throttling the second intake passage, and a control unit connected to the spark plug, the fuel injection valve, and the swirl control valve and configured to output a control signal to the spark plug, the fuel injection valve, and the swirl control valve, respectively. The control unit includes a processor configured to execute an operating range determining module to determine an operating range of the engine and a combustion mode selecting module to select one of a first combustion mode in which SI combustion where a mixture gas formed in the combustion chamber combusts by flame propagation starts and CI combustion where unburned mixture gas combusts by compression ignition is then performed, and a second combustion mode in which only the SI combustion is performed by the flame propagation.

When the operating range determining module determines that an engine load is in a high load range higher than a given load and an engine speed is in a first speed range lower than a given speed, the combustion mode selecting module selects the first combustion mode, and when the operating range determining module determines that the engine load is in the high load range and the engine speed is in a second speed range higher than the given speed, the combustion mode selecting module selects the second combustion mode.

Within the first speed range in which the first combustion mode is selected, the control unit outputs the control signal to the fuel injection valve so that a first injection is performed in a period from intake stroke to an early half of compression stroke so as to form the mixture gas for the CI combustion in the outer circumferential portion and a second injection is performed on the compression stroke so as to form the mixture gas for the SI combustion in the center portion, outputs the control signal to the swirl control valve so as to throttle the second intake passage, and outputs the control signal to the spark plug so as to ignite the mixture gas in the center portion. Within the second speed range in which the second combustion mode is selected, the control signal is outputted to the fuel injection valve so that the fuel injection is performed in a period from the intake stroke to the compression stroke so as to form the mixture gas for the SI combustion in the entire combustion chamber, the control signal is outputted to the swirl control valve so that the throttling amount of the second intake passage becomes smaller than within the first speed range, and the control signal is outputted to the spark plug so as to ignite the mixture gas before a top dead center of compression stroke.

When the relatively strong swirl flow is generated within the first speed range where the engine performs the SPCCI combustion, the SI combustion becomes stable by the high turbulence energy in the center portion and the flame of the SI combustion propagates in the circumferential direction along the strong swirl flow inside the combustion chamber. Then the temperature and pressure of the mixture gas are increased in a given position in the circumferential direction in the outer circumferential portion of the combustion chamber, the unburned mixture gas is ignited by compression, and the CI combustion is started. By generating the strong swirl flow in the SPCCI combustion, the SI combustion is stabilized and the CI combustion is made to be appropriate. Further, variation in the torque between cycles is reduced.

Within the second speed range in the high load range where the engine performs the SI combustion, by making the swirl flow weaker than that within the first speed range, the intake charge amount is secured and the fuel efficiency is improved by the reduction of the pump loss. Note that within the second speed range, the swirl flow may not be generated.

When the operating range determining module determines that the operating range of the engine is within one of the first speed range and the second speed range, the control unit may output the control signal to the fuel injection valve so that a fuel concentration of the mixture gas of the entire combustion chamber has an excess air ratio of 1 or below.

Within the first speed range and the second speed range in the high load range, by making the excess air ratio λ of the mixture gas of the entire combustion chamber 1 or below, sufficient torque can be secured in the high load range and an extended torque feel is obtained.

When the operating range determining module determines that the operating range of the engine is within the second speed range, the control unit may output the control signal to the fuel injection valve so that a crank angle period in which the fuel is injected becomes longer than that within the first speed range.

A geometric compression ratio of the engine may be between 13:1 and 20:1.

In the SPCCI combustion, since the SI combustion controls the CI combustion, it is unnecessary to achieve a high compression end temperature to ignite the mixture gas by the compression. Thus the geometric compression ratio of the engine can be lowered. Lowering the geometric compression ratio and the compression end temperature are advantageous in reducing a cooling loss and a mechanical loss, which improves the fuel efficiency of the engine.

The given load may be an engine load at which combustion pressure is 900 kPa, and the high load range may be a range in which the combustion pressure is above 900 kPa.

BRIEF DESCRIPTION OF THE DRAWINGS

FIG. 17 is a chart illustrating combustion modes.

DETAILED DESCRIPTION OF THE DISCLOSURE

Figure 1:
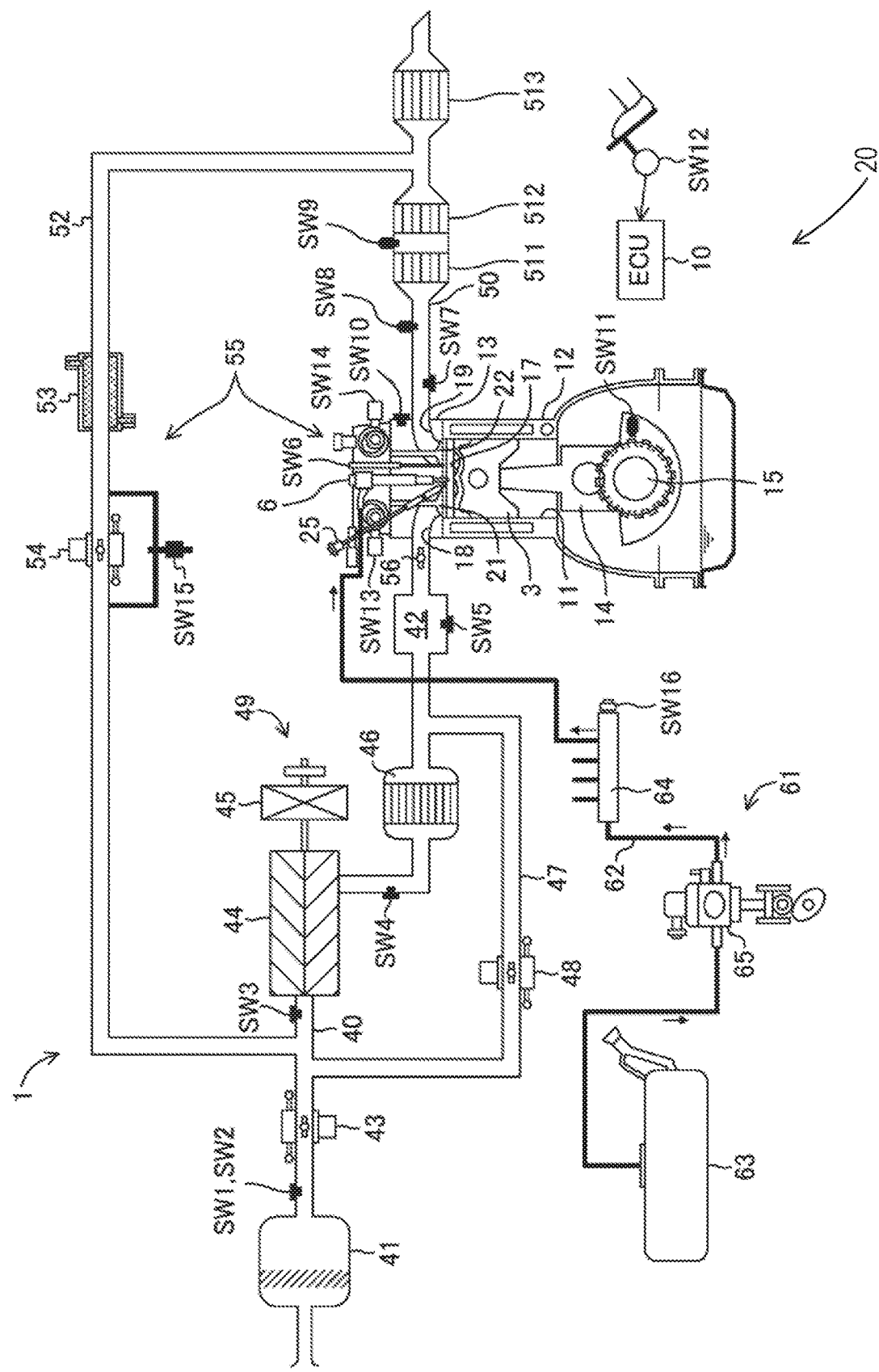
FIG. 1 is a diagram illustrating a configuration of an engine.
Figure 2:
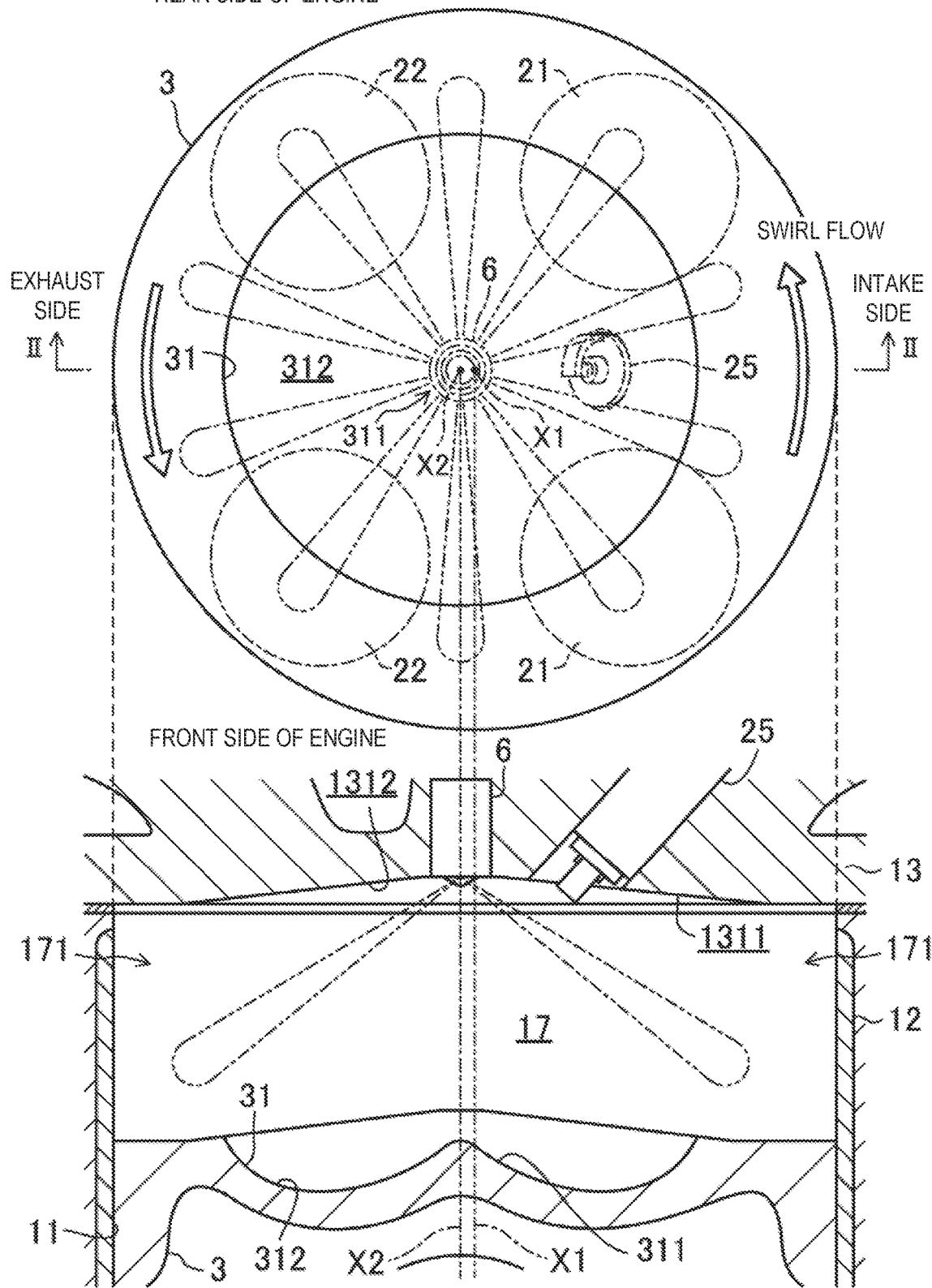
FIG. 2 is a diagram illustrating a structure of a combustion chamber, in which the upper part is a plan view of the combustion chamber and the lower part is a II-II cross-sectional view.
Figure 3:
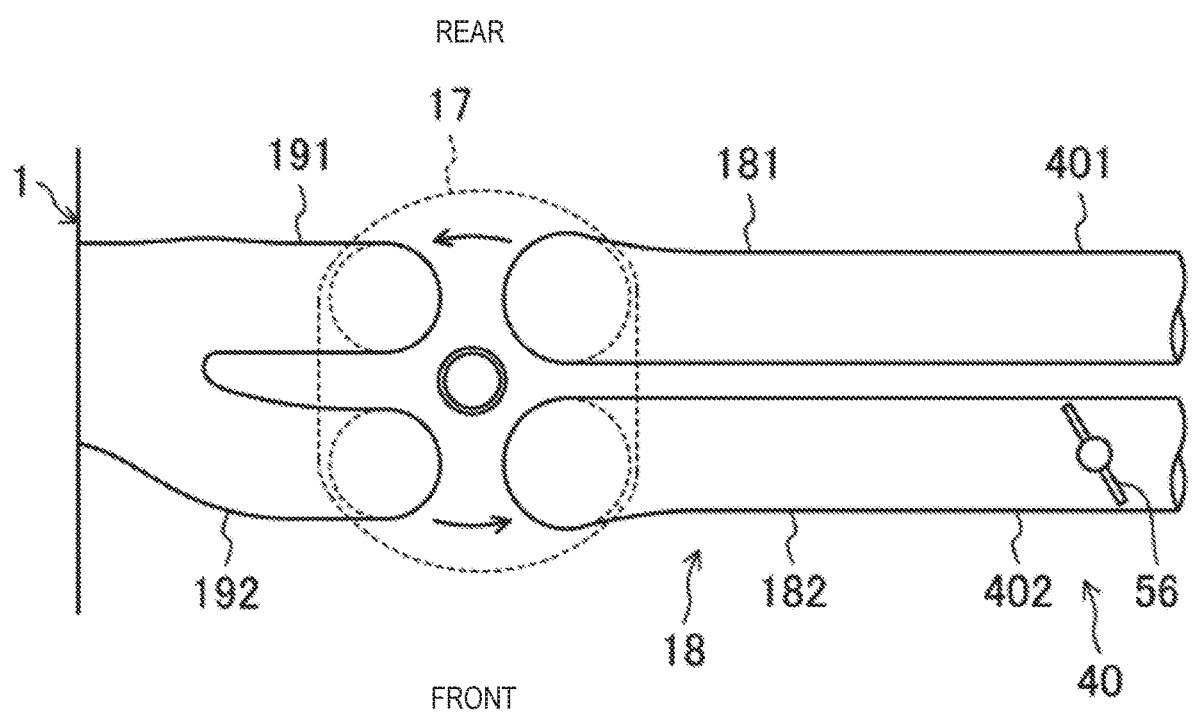
FIG. 3 is a plan view illustrating structures of the combustion chamber and an intake system.
Figure 4:
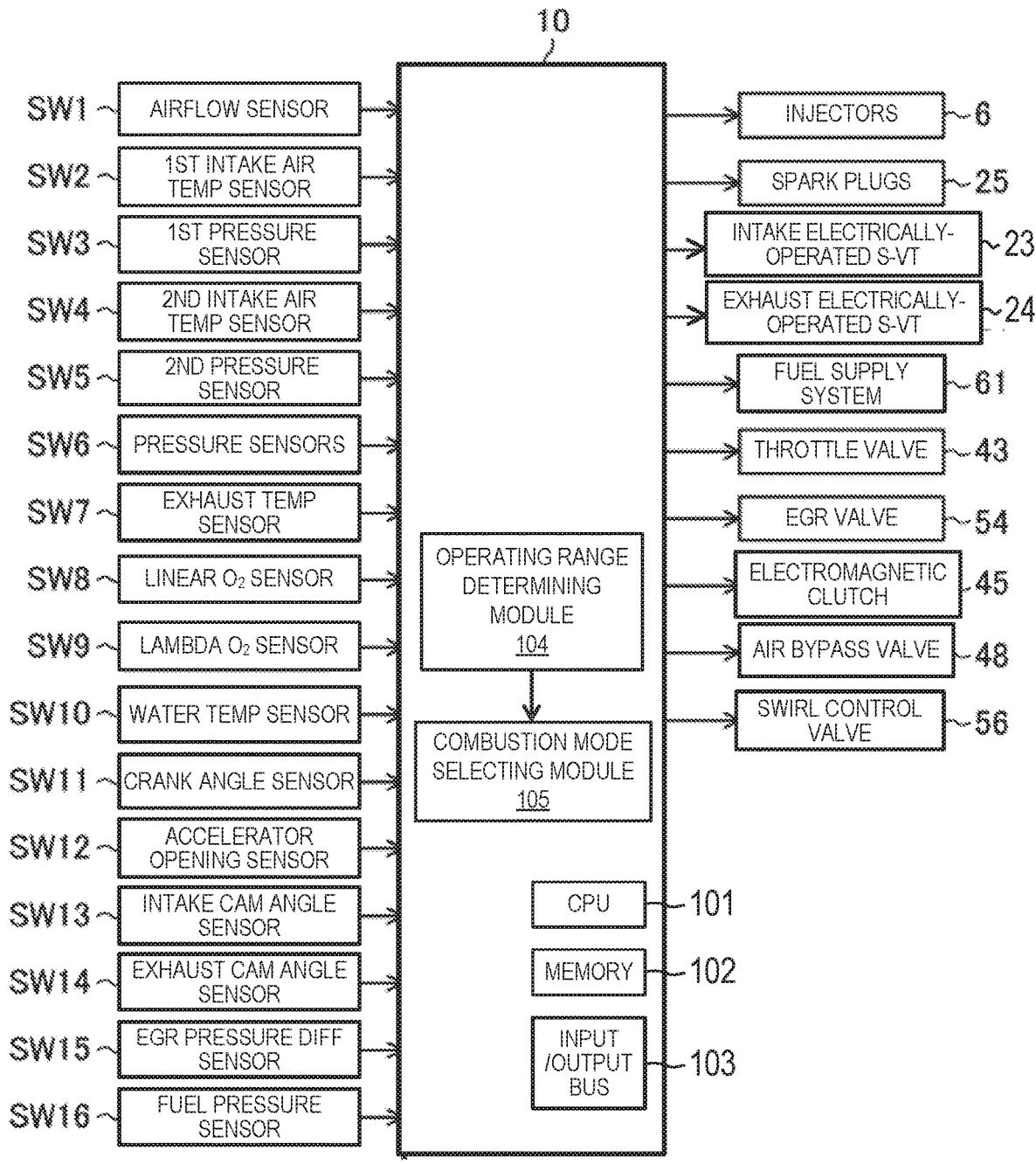
FIG. 4 is a block diagram illustrating a configuration of a control device for the engine.

Hereinafter, one embodiment of a control system for a pre-mixture compression-ignition engine is described in detail with reference to the accompanying drawings. The following description gives one example of the control system for an engine. FIG. 1 is a diagram illustrating a configuration of the engine. FIG. 2 is a diagram illustrating a structure of a combustion chamber, in which the upper part is a plan view of the combustion chamber and the lower part is an II-II cross-sectional view. FIG. 3 is a plan view illustrating structures of the combustion chamber and an intake system. Note that in FIG. 1, an intake side is on the left side and an exhaust side is on the right side of the drawing sheet. Further in FIGS. 2 and 3, the intake side is on the right side and the exhaust side is on the left side of the drawing sheets. FIG. 4 is a block diagram illustrating a configuration of the control device for the engine.

An engine 1 is a four-stroke engine which is operated by a combustion chamber 17 repeating intake stroke, compression stroke, expansion stroke, and exhaust stroke. The engine 1 is mounted on a four-wheel automobile. The automobile travels by the operation of the engine 1. Fuel of the engine 1 is gasoline in this embodiment. The gasoline may contain bioethanol, etc. The fuel of the engine 1 may be any kind of fuel as long as it is liquid fuel containing at least gasoline.

(Engine Configuration)

The engine 1 includes a cylinder block 12 and a cylinder head 13 placed on the cylinder block 12. The cylinder block 12 is formed therein with a plurality of cylinders 11. In FIGS. 1 and 2, only one cylinder 11 is illustrated. The engine 1 is a multi-cylinder engine.

A piston 3 is reciprocatably inserted into each cylinder 11. The piston 3 is coupled to a crankshaft 15 via a connecting rod 14. The piston 3 defines the combustion chamber 17 together with the cylinder 11 and the cylinder head 13. Note that the definition of "combustion chamber" is not limited to a space formed when the piston 3 is at a top dead center on compression stroke (CTDC) but may be broad. That is, "combustion chamber" may mean any space formed by the piston 3, the cylinder 11, and the cylinder head 13 regardless of the position of the piston 3.

As illustrated in the lower part of FIG. 2, a lower surface of the cylinder head 13, that is, a ceiling surface of the combustion chamber 17, is formed by an inclined surface 1311, and an inclined surface 1312. The inclined surface 1311 inclines upwardly toward an injection axis X2 (an axis passing through the center of injection of an injector 6 described later) from the intake side. The inclined surface 1312 inclines upwardly toward the injection axis X2 from the exhaust side. The ceiling surface of the combustion chamber 17 has a so-called pent-roof shape.

An upper surface of the piston 3 bulges toward the ceiling surface of the combustion chamber 17. The piston 3 is dented in its upper surface to form a cavity 31. The cavity 31 is arranged opposing to the injector 6.

The center of the cavity 31 is offset from a center axis X1 of the cylinder 11 to the exhaust side, and coincides with the injection axis X2 of the injector 6. The cavity 31 has a convex section 311. The convex section 311 is located on the injection axis X2 of the injector 6. The convex section 311 has a substantially conical shape. The convex section 311 extends upwardly toward the ceiling surface of the combustion chamber 17 from the bottom of the cavity 31.

The cavity 31 has a dented section 312 formed to surround the convex section 311 entirely. The cavity 31 has a symmetric shape with respect to the injection axis X2.

A circumferential side face of the dented section 312 extends from the bottom surface of the cavity 31 to the opening surface of the cavity 31, inclined with respect to the injection axis X2 (i.e., constituting the circumferential side face of the cavity 31). An inner diameter of the cavity 31 gradually increases from the bottom surface of the cavity 31 to the opening surface of the cavity 31.

Note that the shape of the combustion chamber 17 is not limited to that illustrated in FIG. 2. The shapes of the cavity 31, the upper surface of the piston 3, the ceiling surface of the combustion chamber 17, etc. are suitably changeable. For example, the cavity 31 may have a symmetric shape with respect to the center axis X1 of the cylinder 11. The inclined surfaces 1311 and 1312 may have a symmetric shape with respect to the center axis X1 of the cylinder 11. Further, the cavity 31 may be formed with a shallow section shallower than the dented section 312, at a position opposing to a spark plug 25 described later. A geometric compression ratio of the engine 1 is set to be between 13:1 and 20:1. As described later, within some of operating ranges of the engine 1, the engine 1 performs SPCCI combustion in which SI combustion and CI combustion are combined. In the SPCCI combustion operation, CI combustion is performed by utilizing heat generated by the SI combustion and pressure increase. In this engine 1, it is unnecessary to raise the temperature of the combustion chamber 17 when the piston 3 reaches CTDC for the mixture gas to self-ignite (i.e., the compression end temperature). That is, although the engine 1 performs the CI combustion, its geometric compression ratio is set relatively small. Lowering the geometric compression ratio is advantageous in reducing a cooling loss and a mechanical loss. For example, the geometric compression ratio of the engine 1 may be set to 14:1 to 17:1 in regular specifications (the octane number of the fuel is about 91) and to 15:1 to 18:1 in high-octane specifications (the octane number of the fuel is about 96).

The cylinder head 13 is formed with an intake port 18 for each cylinder 11. As illustrated in FIG. 3, the intake port 18 includes two intake ports of a first intake port 181 and a second intake port 182. The first intake port 181 and the second intake port 182 are arranged in axial directions of the crankshaft 15, i.e., front-and-rear directions of the engine 1. The intake port 18 communicates with the combustion chamber 17. Although not illustrated in detail, the intake port 18 is a so-called tumble port. That is, the intake port 18 has a shape to form a tumble flow in the combustion chamber 17.

An intake valve 21 is disposed in the intake port 18. The intake valve 21 opens and closes the intake port 18 to and from the combustion chamber 17. The intake valve 21 is opened and closed by a valve operating mechanism at a given timing. This valve operating mechanism may be a variable valve mechanism which makes a valve timing and/or valve lift variable. In this configuration example, as illustrated in FIG. 4, the variable valve mechanism has an intake electrically-operated S-VT (Sequential-Valve Timing) 23. The intake electrically-operated S-VT 23 is continuously variable of a rotational phase of an intake camshaft within a given angular range. Thus, the open and close timings of the intake valve 21 continuously change. Note that the operating mechanism of the intake valve 21 may have a hydraulically-operated S-VT instead of the electrically-operated S-VT.

The cylinder head 13 is also formed with an exhaust port 19 for each cylinder 11. As illustrated in FIG. 3, the exhaust port 19 also includes two exhaust ports of a first exhaust port 191 and a second exhaust port 192. The first exhaust port 191 and the second exhaust port 192 are arranged in the front-and-rear directions of the engine 1. The exhaust port 19 communicates with the combustion chamber 17. An exhaust valve 22 is disposed in the exhaust port 19. The exhaust valve 22 opens and closes the exhaust port 19 to and from the combustion chamber 17. The exhaust valve 22 is opened and closed by a valve operating mechanism at a given timing. This valve operating mechanism may be a variable valve mechanism which makes a valve timing and/or valve lift variable. In this configuration example, as illustrated in FIG. 4, the variable valve mechanism has an exhaust electrically-operated S-VT 24. The exhaust electrically-operated S-VT 24 is continuously variable of a rotational phase of an exhaust camshaft within a given angular range. Thus, the open and close timings of the exhaust valve 22 continuously change. Note that the valve operating mechanism of the exhaust valve 22 may have a hydraulically-operated S-VT instead of the electrically-operated S-VT.

The engine 1 adjusts the length of an overlap period of an open timing of the intake valve 21 and a close timing of the exhaust valve 22 by the intake electrically-operated S-VT 23 and the exhaust electrically-operated S-VT 24, so that hot burned gas is enclosed within the combustion chamber 17. That is, internal EGR (Exhaust Gas Recirculation) gas is introduced into the combustion chamber 17. Further, by adjusting the length of the overlap period, residual gas in the combustion chamber 17 is scavenged.

The injector 6 is attached to the cylinder head 13 for each cylinder 11. The injector 6 injects the fuel directly into the combustion chamber 17. The injector 6 is disposed in a valley portion of the pent roof where the inclined surface 1311 on the intake side and the inclined surface 1312 on the exhaust side intersect, so as to be oriented into the combustion chamber 17. As illustrated in FIG. 2, the injector 6 is disposed so that its injection axis is located parallel to the center axis X1 of the cylinder 11. The injection axis X2 of the injector 6 is offset from the center axis X1. The injection axis of the injector 6 coincides with the position of the convex section 311 of the cavity 31. The injector 6 is oriented toward the cavity 31. Note that the injection axis of the injector 6 may coincide with the center axis X1 of the cylinder 11. Also in this case, it is desirable that the injection axis of the injector 6 coincides with the position of the convex section 311 of the cavity 31.

Although not illustrated in detail, the injector 6 is constructed by a multi-port fuel injection valve having a plurality of nozzle ports. As illustrated by two-dotted chain lines in FIG. 2, the injector 6 injects the fuel so that it radially spreads obliquely downward from the radial center of a ceiling portion of the combustion chamber 17. In this configuration example, the injector 6 has ten nozzle ports, and the nozzle ports are arranged at an even angular interval in the circumferential direction. As illustrated in the upper part of FIG. 2, the axes of the nozzle ports do not circumferentially overlap with the spark plug 25 described later.

That is, the spark plug 25 is sandwiched between the axes of two adjacent nozzle ports. Thus, the fuel spray injected from the injector 6 is prevented from directly hitting the spark plug 25 and wetting an electrode.

A fuel supply system 61 is connected to the injector 6. The fuel supply system 61 includes a fuel tank 63 configured to store the fuel and a fuel supply path 62 connecting the fuel tank 63 with the injector 6. A fuel pump 65 and a common rail 64 are provided in the fuel supply path 62. The fuel pump 65 pumps the fuel to the common rail 64. In this embodiment, the fuel pump 65 is a plunger pump which is driven by the crankshaft 15. The common rail 64 stores the fuel pumped from the fuel pump 65 at high fuel pressure. When the injector 6 opens, the fuel stored in the common rail 64 is injected into the combustion chamber 17 from the nozzle ports of the injector 6. The fuel supply system 61 is able to supply the fuel at a high pressure of 30 MPa or higher to the injector 6. A highest fuel pressure of the fuel supply system 61 may be, for example, about 120 MPa. The pressure of the fuel supplied to the injector 6 may be changed according to an operating state of the engine 1. Note that the structure of the fuel supply system 61 is not limited to the above structure.

The spark plug 25 is attached to the cylinder head 13 for each cylinder 11. The spark plug 25 forcibly ignites the mixture gas in the combustion chamber 17. In this configuration example, as illustrated in FIG. 2, the spark plug 25 is disposed at an intake side of the cylinder 11 with respect to the center axis X1 of the cylinder 11. The spark plug 25 is located adjacent to the injector 6. The spark plug 25 is located between the two intake ports 18. The spark plug 25 is attached to the cylinder head 13 to extend downwardly, toward the center of the combustion chamber 17 in a tilted posture with respect to up-and-down directions of the cylinder head 13. The electrode of the spark plug 25 is located near the ceiling surface of the combustion chamber 17 to be oriented toward inside the combustion chamber 17.

An intake passage 40 is connected to one side of the engine 1. The intake passage 40 communicates with the intake ports 18 of the cylinders 11. The intake passage 40 is a passage through which gas to be introduced into the combustion chamber 17 flows. An air cleaner 41 which filters fresh air is disposed in an upstream end part of the intake passage 40. A surge tank 42 is disposed near a downstream end of the intake passage 40. A part of the intake passage 40 downstream of the surge tank 42 forms independent passages branched for the respective cylinders 11. Downstream ends of the independent passages communicate with the intake ports 18 of the cylinders 11, respectively.

A throttle valve 43 is disposed in the intake passage 40 between the air cleaner 41 and the surge tank 42. The throttle valve 43 adjusts an introduction amount of fresh air into the combustion chamber 17 by adjusting an opening thereof.

A booster 44 is disposed in the intake passage 40 downstream of the throttle valve 43. The booster 44 boosts the gas introduced into the combustion chamber 17. In this configuration example, the booster 44 is a supercharger which is driven by the engine 1. The booster 44 may be, for example, of a Roots type. The booster 44 may have any structure, for example, of a Lysholm type, a Vane type, or a centrifugal type.

An electromagnetic clutch 45 is interposed between the booster 44 and the engine 1. The electromagnetic clutch 45 controls the flow of driving force between the booster 44 and the engine 1, for example, it transmits driving force from the engine 1 to the booster 44 or interrupts the transmission of the driving force therebetween. As is described later, by an ECU 10 (Engine Control Unit) switching the connection/disconnection of the electromagnetic clutch 45, the on/off of the booster 44 is switched. In this engine 1, whether to boost the gas to be introduced into the combustion chamber 17 by the booster 44 or not is switchable therebetween.

An intercooler 46 is disposed in the intake passage 40 downstream of the booster 44. The intercooler 46 cools the gas compressed in the booster 44. The intercooler 46 may be, for example, of a water cooling type.

A bypass passage 47 is connected to the intake passage 40. The bypass passage 47 connects a part of intake passage 40 upstream of the booster 44 to a part of the intake passage 40 downstream of the intercooler 46 so as to bypass the booster 44 and the intercooler 46. An air bypass valve 48 is disposed in the bypass passage 47. The air bypass valve 48 adjusts a flow rate of the gas flowing through the bypass passage 47.

When the booster 44 is turned off (that is, when the electromagnetic clutch 45 is disconnected), the air bypass valve 48 is fully opened. Thus, the gas flowing through the intake passage 40 bypasses the booster 44 and is introduced into the combustion chamber 17 of the engine 1. The engine 1 operates in a non-boosted state, that is, in a naturally aspirated state.

When the booster 44 is turned on (that is, when the electromagnetic clutch 45 is connected), the gas passed through the booster 44 partially flows back upstream of the booster 44 through the bypass passage 47. By controlling an opening of the air bypass valve 48, the backflow amount is adjusted, which results in adjusting the boosting pressure of the gas introduced into the combustion chamber 17. In this configuration example, a boosting system 49 is comprised of the booster 44, the bypass passage 47 and the air bypass valve 48.

The engine 1 has a swirl generating part which generates a swirl flow inside the combustion chamber 17. As illustrated in FIG. 3, the swirl generating part is a swirl control valve (SCV) 56 attached to the intake passage 40. The SCV 56 is disposed in a passage. The passage is one of a primary passage 401 and a secondary passage 402 communicating with the first intake port 181 and the second intake port 182, respectively. The SCV 56 is an opening regulating valve which is capable of adjusting an opening of a cross section of the secondary passage. When the opening of the SCV 56 is small, the flow rate of the intake air into the combustion chamber 17 from the first intake port 181 relatively increases while the flow rate of the intake air into the combustion chamber 17 from the second intake port 182 is relatively reduced. Thus, the swirl flow inside the combustion chamber 17 becomes strong. When the opening of the SCV 56 is large, the flow rates of the intake air into the combustion chamber 17 from the first intake port 181 and the second intake port 182 become substantially even, and thus the swirl flow inside the combustion chamber 17 becomes weak. When the SCV 56 is fully opened, the swirl flow does not occur. Note that the swirl flow circulates in the counterclockwise direction in FIG. 3 as indicated by the arrows (also see the white outlined arrows in FIG. 2).

Note that alternatively/additionally to attaching the SCV 56 to the intake passage 40, the swirl generating part may adopt a structure in which the open periods of the two intake valves 21 are varied so as to introduce the intake air into the combustion chamber 17 from only one of the intake valves 21. By opening only one of the two intake valves 21, the intake air is introduced unevenly into the combustion chamber 17, and thus, the swirl flow is generated in the combustion chamber 17. Alternatively, the shapes of the intake ports 18 may be devised so that the swirl generating part generates the swirl flow inside the combustion chamber 17.

An exhaust passage 50 is connected to the other side of the engine 1 opposite from the intake passage 40. The exhaust passage 50 communicates with the exhaust ports 19 of the cylinders 11. The exhaust passage 50 is a passage through which the exhaust gas discharged from the combustion chamber 17 flows. Although not illustrated in detail, an upstream part of the exhaust passage 50 constitutes independent passages branched for the respective cylinders 11. Upstream ends of the independent passages are connected to the exhaust ports 19 of the cylinders 11, respectively.

An exhaust gas purification system having a plurality of catalytic converters is disposed in the exhaust passage 50. Although not illustrated, the catalytic converter on the upstream side is disposed in an engine bay and has a three-way catalyst 511 and a GPF (Gasoline Particulate Filter) 512. The catalytic converter on the downstream side is disposed outside the engine bay and has a three-way catalyst 513. Note that the exhaust gas purification system is not limited to have the illustrated structure.

An EGR passage 52 constituting an external EGR system is connected between the intake passage 40 and the exhaust passage 50. The EGR passage 52 is a passage for recirculating a portion of the burned gas to the intake passage 40. An upstream end of the EGR passage 52 is connected to the exhaust passage 50 between the upstream catalytic converter and the downstream catalytic converter. A downstream end of the EGR passage 52 is connected to the intake passage 40 upstream of the booster 44.

A water-cooling type EGR cooler 53 is disposed in the EGR passage 52. The EGR cooler 53 cools the burned gas. An EGR valve 54 is also disposed in the EGR passage 52. The EGR valve 54 adjusts the flow rate of the burned gas in the EGR passage 52. By adjusting an opening of the EGR valve 54, the recirculation amount of the cooled burned gas (i.e., external EGR gas) is adjusted.

In this configuration example, an EGR system 55 includes an external EGR system including the EGR passage 52 and the EGR valve 54, and an internal EGR system including the intake electrically-operated S-VT 23 and the exhaust electrically-operated S-VT 24 described above.

A control system 20 for the compression self-ignition engine includes the ECU 10 configured to operate the engine 1. As illustrated in FIG. 4, the ECU 10 is a control unit based on a well-known microcomputer and includes a central processing unit (CPU) 101 configured to execute program (s)/instructions, memory 102 comprised of RAM(s) (Random Access Memory) and ROM(s) (Read Only Memory) and configured to store the program(s)/instructions and data, and an input/output bus 103 configured to input and output electric signals, an operating range determining module 104 configured to determine an operating range of the engine, and a combustion mode selecting module 105 configured to select one of a first combustion mode in which SI combustion in which mixture gas formed in the combustion chamber combusts by flame propagation starts and then CI combustion in which unburned mixture gas combusts by compression ignition is performed, and a second combustion mode in which only the SI combustion is performed by the flame propagation. The CPU 101 is configured to execute the operating range determining module 104 and the combustion mode selecting module 105 to perform their respective functions. These modules are stored in the memory 102 as software. The ECU 10 is one example of a "control unit."

As illustrated in FIGS. 1 and 4, various sensors SW1 to SW16 are connected to the ECU 10. The sensors SW1 to SW16 output detection signals to the ECU 10. The sensors include the following sensors.

That is, the sensors include an airflow sensor SW1 disposed in the intake passage 40 downstream of the air cleaner 41 and configured to detect the flow rate of fresh air in the intake passage 40, a first intake air temperature sensor SW2 also disposed in the intake passage 40 downstream of the air cleaner 41 and configured to detect a temperature of the fresh air, a first pressure sensor SW3 disposed in the intake passage 40 downstream of the connecting position with the EGR passage 52 and upstream of the booster 44, and configured to detect pressure of the gas flowing into the booster 44, a second intake air temperature sensor SW4 disposed in the intake passage 40 downstream of the booster 44 and upstream of the connecting position of the bypass passage 47 and configured to detect a temperature of the gas flowed out of the booster 44, a second pressure sensor SW5 attached to the surge tank 42 and configured to detect pressure of the gas at a position downstream of the booster 44, pressure sensors SW6 attached to the cylinder head 13 corresponding to the cylinders 11 and configured to detect pressure in the combustion chambers 17, respectively, an exhaust temperature sensor SW7 disposed in the exhaust passage 50 and configured to detect a temperature of the exhaust gas discharged from the combustion chamber 17, a linear $O_2$ sensor SW8 disposed in the exhaust passage 50 upstream of the upstream catalytic converter and configured to detect an oxygen concentration within the exhaust gas, a lambda $O_2$ sensor SW9 disposed in the upstream catalytic converter downstream of the three-way catalyst 511 and configured to detect the oxygen concentration within the exhaust gas, a water temperature sensor SW10 attached to the engine 1 and configured to detect a temperature of the cooling water, a crank angle sensor SW11 attached to the engine 1 and configured to detect a rotational angle of the crankshaft 15, an accelerator opening sensor SW12 attached to an accelerator pedal mechanism and configured to detect an accelerator opening corresponding to an operation amount of an accelerator pedal, an intake cam angle sensor SW13 attached to the engine 1 and configured to detect a rotational angle of the intake camshaft, an exhaust cam angle sensor SW14 attached to the engine 1 and configured to detect a rotational angle of the exhaust camshaft, an EGR pressure difference sensor SW15 disposed in the EGR passage 52 and configured to detect a difference in pressure between positions upstream and downstream of the EGR valve 54, and a fuel pressure sensor SW16 attached to the common rail 64 of the fuel supply system 61 and configured to detect pressure of the fuel to be supplied to the injector 6.

Based on these detection signals, the ECU 10 determines the operating state of the engine 1 and calculates control amounts of the various devices. The ECU 10 outputs control signals related to the calculated control amounts to the injector 6, the spark plug 25, the intake electrically-operated S-VT 23, the exhaust electrically-operated S-VT 24, the fuel supply system 61, the throttle valve 43, the EGR valve 54, the electromagnetic clutch 45 of the booster 44, the air bypass valve 48, and the SCV 56. For example, the ECU 10 adjusts the boosting pressure by controlling an opening of the air bypass valve 48 based on a pressure difference between the upstream side and the downstream side of the booster 44, which is obtained from the detection signals of the first pressure sensor SW3 and the second pressure sensor SW5. Further, the ECU 10 adjusts an external EGR gas amount introduced into the combustion chamber 17 by controlling the opening of the EGR valve 54 based on the pressure difference between the upstream and downstream positions of the EGR valve 54 obtained from the detection signal of the EGR pressure difference sensor SW15. Details of the control of the engine 1 by the ECU 10 are described later.

(Operating Range of Engine)

Figure 5:
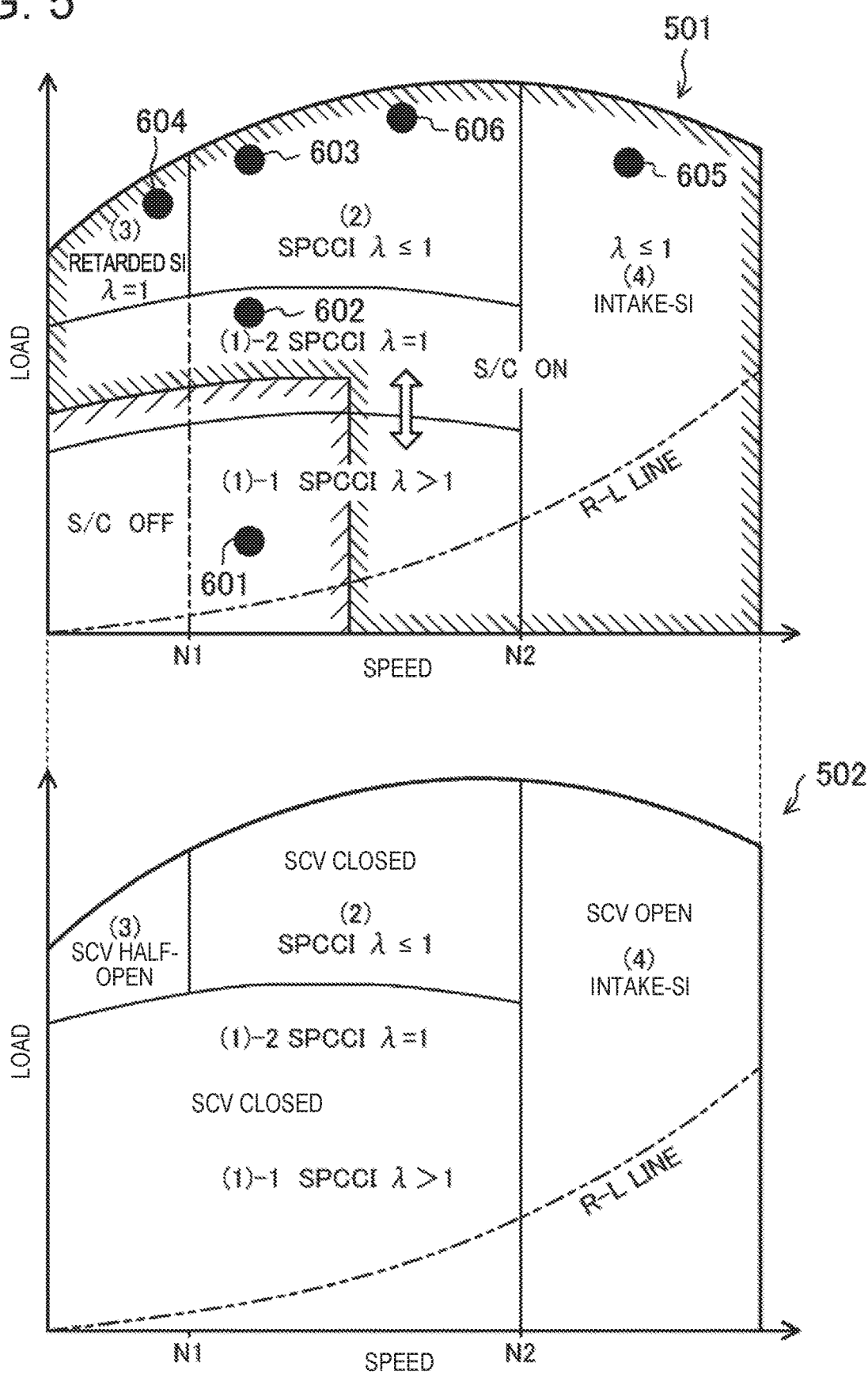
FIG. 5 shows charts illustrating operating range maps of the engine.

FIG. 5 illustrates operating range maps 501 and 502 of the engine 1. The operating range maps 501 and 502 of the engine 1 are divided into five ranges in terms of the engine load and the engine speed. For example, the five ranges include: a low load range (1)-1 including the idle operation and extending in low and medium engine speed ranges; a medium load range (1)-2 in which the engine load is higher than the low load range and extending in the low and medium engine speed ranges; a high-load medium-speed range (2) in which the engine load is higher than the medium load range (1)-2 and which is located in the high load range including the full engine load; a high-load low-speed range (3) located in the high load range and in which the engine speed is lower than the high-load medium-speed range (2); and a high speed range (4) in which the engine speed is higher than the low load range (1)-1, the medium load range (1)-2, the high-load medium-speed range (2), and the high-load low-speed range (3). Here, the low speed range, the medium speed range, and the high speed range may be defined by substantially evenly dividing, in the engine speed direction, the entire operating range of the engine 1 into three ranges of the low speed range, the medium speed range and the high speed range. In the example of FIG. 5, the engine speed lower than a speed N1 is defined as low, the engine speed higher than a speed N2 is defined as high, and the engine speed between the engine speeds N1 and N2 is defined as medium. For example, the speed N1 may be about 1,200 rpm and the speed N2 may be about 4,000 rpm. The high-load medium-speed range (2) may be a range in which combustion pressure exceeds 900 kPa. In FIG. 5, the operating range maps 501 and 502 of the engine 1 are separately illustrated for the sake of easier understanding. The map 501 illustrates a state of the mixture gas and a combustion mode within each range, and a driving range and a non-driving range of the booster 44. The map 502 illustrates the opening of the SCV 56 within each range. Note that the two-dotted chain line in FIG. 5 indicates the road-load line of the engine 1.

Mainly for improving fuel efficiency and the exhaust gas performance, the engine 1 performs combustion by compression self-ignition within the low load range (1)-1, the medium load range (1)-2, and the high-load medium-speed range (2). Further, the engine 1 performs the combustion by spark-ignition within the other ranges, specifically, the high-load low-speed range (3) and the high speed range (4). Hereinafter, the operation of the engine 1 within each range is described in detail with reference to the fuel injection timing and the ignition timing illustrated in FIG. 6.

(Low Load Range (1)-1)

When the engine 1 is operating within the low load range (1)-1, the engine 1 performs the CI combustion as described above. In the combustion caused by self-ignition, the timing of the self-ignition changes greatly if the temperature inside the combustion chamber 17 varies before the compression starts. Therefore, within the low load range (1)-1, the engine 1 performs the SPCCI combustion in which the SI combustion and the CI combustion are combined.

Figure 6:
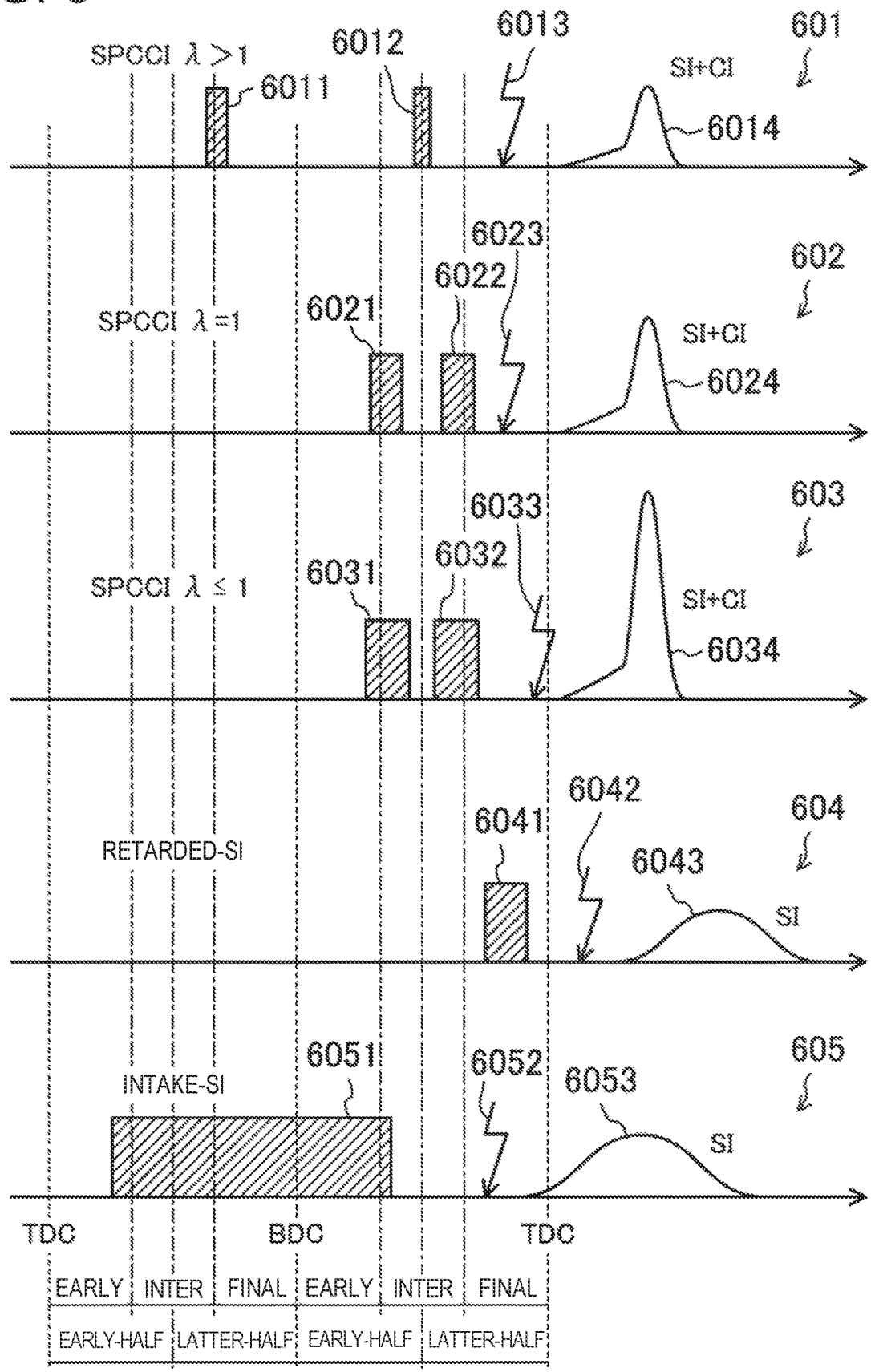
FIG. 6 shows charts illustrating a fuel injection timing, an ignition timing, and a combustion waveform in each operating range.

A reference character 601 in FIG. 6 indicates one example of fuel injection timings (reference characters 6011 and 6012) and an ignition timing (a reference character 6013), and a combustion waveform (i.e., a waveform indicating a change in heat generation rate with respect to the crank angle; a reference character 6014) when the engine 1 is operating in the operating state of the reference character 601 within the low load range (1)-1.

In the SPCCI combustion, the spark plug 25 forcibly ignites the mixture gas inside the combustion chamber 17 so that it is subjected to the SI combustion through flame propagation, and the heat generated by this combustion raises the temperature inside the combustion chamber 17 and the pressure inside the combustion chamber 17 rises by flame propagation, which leads to the CI combustion of unburned mixture gas by self-ignition.

It is possible to reduce the variation of the temperature inside the combustion chamber 17 before the compression starts by adjusting the heat generation amount in the SI combustion. Therefore, even when the temperature inside the combustion chamber 17 varies before the compression starts, for example, by controlling the ignition timing to adjust the start timing of the SI combustion, the timing of self-ignition is controlled.

In the case of performing the SPCCI combustion, the spark plug 25 ignites the mixture gas at a given timing near CTDC, and thus, the combustion through flame propagation starts. The heat generation in the SI combustion is slower than the heat generation in the CI combustion. Therefore, the waveform of the heat generation rate has a relatively gentle rising slope. Moreover, although not illustrated, a pressure variation $(dp/d\theta)$ in the combustion chamber 17 is gentler in the SI combustion than in the CI combustion.

When the temperature and pressure inside the combustion chamber 17 rise due to the SI combustion, the unburned mixture gas self-ignites. In the example of FIG. 6, the slope of the waveform of the heat generation rate changes from gentle to sharp at the self-ignition timing, i.e., the waveform of the heat generation rate has a flexion point at a timing when the CI combustion starts.

After the CI combustion starts, the SI combustion and the CI combustion are performed in parallel. In the CI combustion, since the heat generation is larger than in the SI combustion, the heat generation rate becomes relatively high. Note that since the CI combustion is performed after CTDC, the piston 3 descends by motoring. Therefore, the slope of the waveform of the heat generation rate by the CI combustion is avoided from becoming excessively sharp. The $dp/d\theta$ in the CI combustion also becomes relatively gentle.

The $dp/d\theta$ is usable as an index expressing combustion noise. Since the SPCCI combustion is able to lower the $dp/d\theta$ as described above, it becomes possible to avoid combustion noise from becoming excessively loud. Thus, combustion noise is reduced below an allowable value.

The SPCCI combustion ends by finishing the CI combustion. The CI combustion has a shorter combustion period than in the SI combustion. The SPCCI combustion advances the combustion end timing compared to the SI combustion. In other words, the SPCCI combustion brings the combustion end timing on the expansion stroke closer to CTDC. The SPCCI combustion is advantageous in improving fuel efficiency of the engine 1 compared to the SI combustion.

In order to improve the fuel efficiency of the engine 1, the EGR system 55 introduces the EGR gas into the combustion chamber 17 when the engine 1 is operating within the low load range (1)-1.

When the engine 1 is operating within the low load range (1)-1, the strong swirl flow is formed in the combustion chamber 17. The swirl flow is strong in an outer circumferential portion of the combustion chamber 17 and weak in a center portion. The SCV 56 is fully closed or has a given narrow opening. As described above, since the intake port 18 is a tumble port, an oblique swirl flow having a tumble component and a swirl component is formed in the combustion chamber 17.

Figure 7:
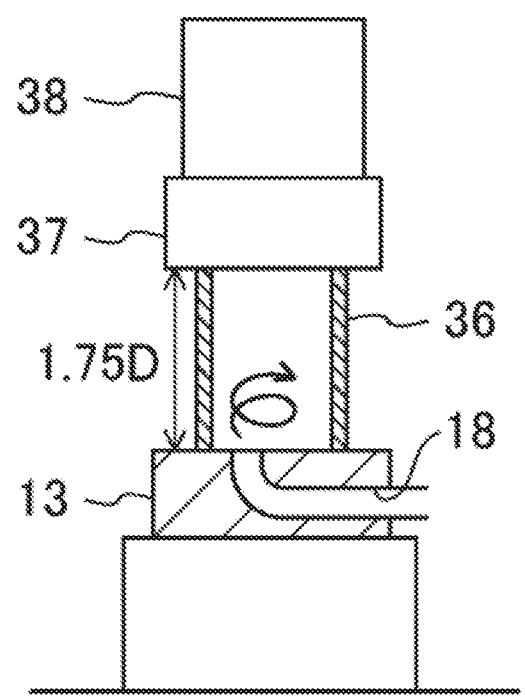
FIG. 7 is a diagram illustrating a rig test device for measuring a swirl ratio.

When the engine 1 operates within the low load range (1)-1, a swirl ratio is 4 or above. Here, "swirl ratio" may be defined as a value obtained by measuring an intake flow lateral angular speed for each valve lift, integrating these values, and dividing this integrated value by an engine angular speed. The intake flow lateral angular speed may be obtained based on a measurement using a rig test device illustrated in FIG. 7. Specifically, the device illustrated in FIG. 7 is structured by placing the cylinder head 13 upside down on a pedestal to connect the intake port 18 to an intake air supply device (not illustrated), and placing a cylinder 36 on the cylinder head 13 to connect, at its upper end, to an impulse meter 38 having a honeycomb rotor 37. A lower surface of the impulse meter 38 is positioned 1.75 D (wherein "D" is a cylinder bore diameter) away from a mating surface between the cylinder head 13 and the cylinder 36. The impulse meter 38 measures torque which acts on the honeycomb rotor 37 by a swirl generated in the cylinder 36 according to the supply of the intake air (see the arrow in FIG. 7), and the intake flow lateral angular speed is obtained based on the torque.

Figure 8:
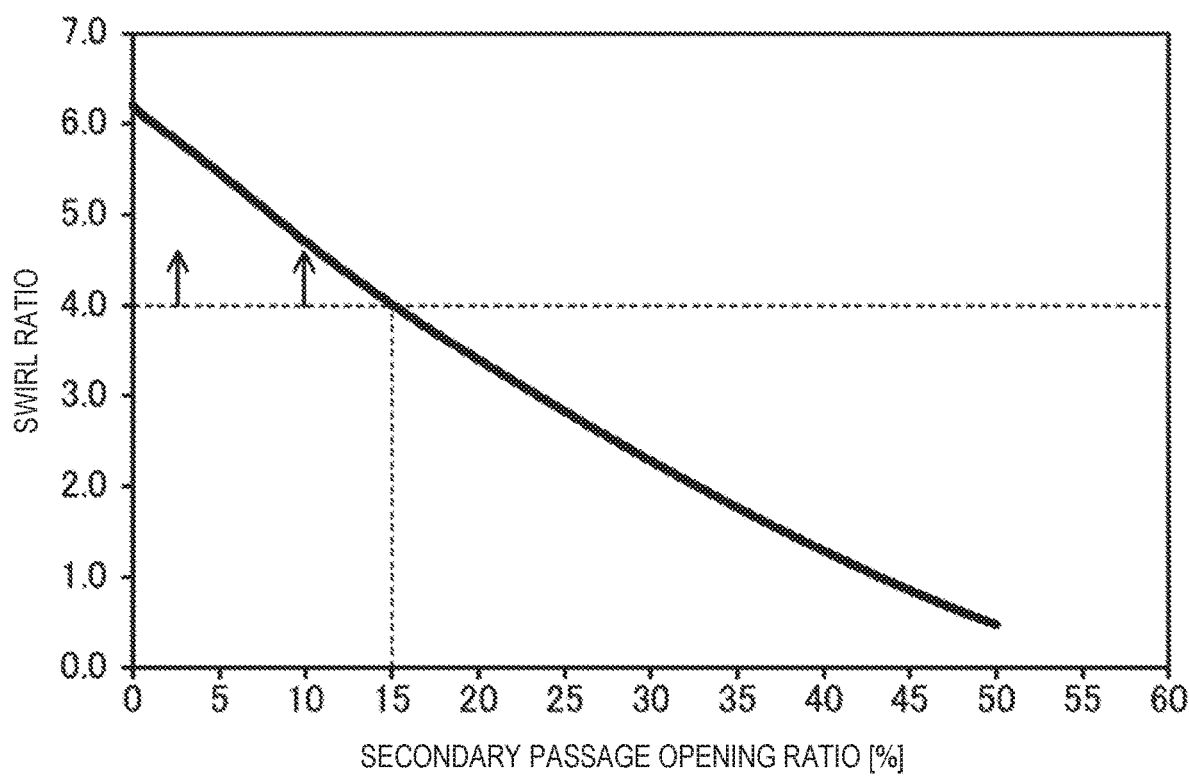
FIG. 8 is a chart illustrating a relationship between an opening ratio of a secondary passage and the swirl ratio.

FIG. 8 illustrates a relationship between the opening of the SCV 56 of the engine 1 and the swirl ratio. In FIG. 8, the opening of the SCV 56 is expressed by an opening ratio with respect to the cross section of the secondary passage 402 when fully opened. The opening ratio of the secondary passage 402 is 0% when the SCV 56 is fully closed, and increases from 0% as the opening of the SCV 56 increases. The opening ratio of the secondary passage 402 is 100% when the SCV 56 is fully opened. As illustrated in FIG. 8, in the engine 1, the swirl ratio becomes around 6 when the SCV 56 is fully closed. When the engine 1 operates within the low load range (1)-1, the swirl ratio may be between 4 and 6. The opening of the SCV 56 may be adjusted within a range of the opening ratio of about 0% to 15%.

When the engine 1 operates within the low load range (1)-1, an air-fuel ratio (A/F) of the mixture gas is leaner than a stoichiometric air-fuel ratio in the entire combustion chamber 17. That is, an excess air ratio λ of the mixture gas exceeds 1 in the combustion chamber 17 as a whole. More specifically, the A/F of the mixture gas in the entire combustion chamber 17 is 30:1 or higher. In this manner, generation of raw $NO_x$ is reduced and the exhaust gas performance is improved.

When the engine 1 operates within the low load range (1)-1, the mixture gas is stratified between the center portion and the outer circumferential portion of the combustion chamber 17. The center portion of the combustion chamber 17 is the portion where the spark plug 25 is disposed, and the outer circumferential portion is the portion around the center portion and in contact with a liner of the cylinder 11. The center portion of the combustion chamber 17 may be defined as a portion where the swirl flow is weak and the outer circumferential portion may be defined as a portion where the swirl flow is strong.

The fuel concentration of the mixture gas in the center portion is higher than that in the outer circumferential portion. For example, the A/F of the mixture gas in the center portion is between 20:1 and 30:1, and the A/F of the mixture gas in the outer circumferential portion is 35:1 or above. Note that the A/F is the air-fuel ratio at the ignition timing, and the same applies for the description below.

When the engine 1 operates within the low load range (1)-1, the injector 6 basically injects the fuel into the combustion chamber 17 on the intake stroke and the compression stroke (the reference characters 6011 and 6012). The fuel injected on the intake stroke is spread in the combustion chamber 17 entirely, before the ignition timing. The fuel injected on the intake stroke forms the mixture gas in the center portion and the outer circumferential portion of the combustion chamber 17. The fuel injected on the compression stroke ignites within a short time, it reaches near the spark plug 25 in the center portion of the combustion chamber 17 by the swirl flow, without spreading much. The fuel injected on the compression stroke forms the mixture gas in the center portion together with a portion of the fuel injected on the intake stroke. The mixture gas is stratified in the center portion and the outer circumferential portion of the combustion chamber 17.

After the fuel injection is ended, the spark plug 25 ignites the mixture gas in the center portion of the combustion chamber 17 at the given timing before CTDC (the reference character 6013). Since the fuel concentration of the mixture gas in the center portion is relatively high, ignitability improves and the SI combustion by the flame propagation stabilizes. By stabilizing the SI combustion, the CI combustion starts at the suitable timing. The controllability of the CI combustion improves in the SPCCI combustion. As a result, when the engine 1 operates within the low load range (1)-1, both the reduction of the generation of combustion noise and the improvement of the fuel efficiency by the shortening of the combustion period are achieved.

The fuel injection timing and the number of times of fuel injections performed when the engine 1 operates within the low load range (1)-1 is changed according to the engine load. For example, when the engine load is low, the number of times of the fuel injections performed on the compression stroke is increased and the completion timing of the fuel injection retards. That is, when the engine load is low, the split number of fuel injections (the number of times of performing fuel injections by splitting the fuel for one combustion cycle) performed on the compression stroke is increased and the timing of the final fuel injection is retarded. Although the fuel amount to be supplied into the combustion chamber 17 decreases when the engine load is low, the split number of fuel injections performed on the compression stroke is increased and the timing of the final fuel injection is retarded so as to suppress the diffuse of the fuel injected on the compression stroke. As a result, the size of the mixture gas layer of which the fuel concentration is relatively high, formed in the center portion of the combustion chamber 17, becomes small.

Further, when the engine load is high, the number of times of the fuel injections performed on the compression stroke is reduced and their injection timings are advanced. As a result of advancing the fuel injection timings, without performing the fuel injection on the compression stroke, the fuel may be injected in the split injections on the intake stroke. When the engine load is high, the fuel may be injected in a lump on the intake stroke. When the engine load increases, the fuel amount to be supplied into the combustion chamber 17 increases and the fuel injection timings are advanced, and thus, the fuel is easily diffused. As a result, the size of the mixture gas layer of which the fuel concentration is relatively high, formed in the center portion of the combustion chamber 17, becomes large.

Since the engine 1 performs the SPCCI combustion by making the mixture gas leaner than the stoichiometric air-fuel ratio within the low load range (1)-1, the low load range (1)-1 may be referred to as "SPCCI lean range."

(Medium Load Range (1)-2)

Also when the engine 1 is operating within the medium load range (1)-2, the engine 1 performs the SPCCI combustion similarly to the low load range (1)-1.

A reference character 602 in FIG. 6 indicates one example of the fuel injection timings (reference characters 6021 and 6022) and the ignition timing (a reference character 6023), and the combustion waveform (a reference character 6024) when the engine 1 is operating in the operating state of the reference character 602 within the medium load range (1)-2 of the engine 1.

The EGR system 55 introduces the EGR gas into the combustion chamber 17 when the operating state of the engine 1 is within the medium load range (1)-2.

Also when the engine 1 operates within the medium load range (1)-2, similarly to the low load range (1)-1, a strong swirl flow at a swirl ratio of 4 or above is formed in the combustion chamber 17. The SCV 56 is fully closed or has a given narrow opening. Since turbulence kinetic energy in the combustion chamber 17 increases by enhancing the swirl flow, when the engine 1 operates within the medium load range (1)-2, the flame of the SI combustion propagates promptly and the SI combustion is stabilized. The controllability of the CI combustion improves by stabilizing the SI combustion. By making the timing of the CI combustion in the SPCCI combustion appropriate, the generation of combustion noise is reduced and the fuel efficiency is improved. Further, the variation in torque between cycles is reduced.

When the engine 1 operates within the medium load range (1)-2, the air-fuel ratio (A/F) of the mixture gas is at the stoichiometric air-fuel ratio (A/F=14.7:1) in the entire combustion chamber 17. The three-way catalyst purifies the exhaust gas discharged from the combustion chamber 17. Thus, high exhaust gas performance of the engine 1 is obtained. The A/F of the mixture gas may be set to remain within a purification window of the three-way catalyst (i.e., an air-fuel ratio width exhibiting the three-way purification function). Therefore, the excess air ratio λ of the mixture gas may be 1.0±0.2.

When the engine 1 operates within the medium load range (1)-2, the injector 6 injects the fuel into the combustion chamber 17 in two stages, a first-stage injection (i.e., a first injection, the reference character 6021) and the second-stage injection (i.e., a second injection, the reference character 6022). In the first-stage injection, the fuel is injected at the timing separated from the ignition timing, and in the second-stage injection, the fuel is injected at the timing close to the ignition timing. The first-stage injection may be performed, for example, in an early half of the compression stroke, and the second-stage injection may be performed, for example, in a latter half of the compression stroke. The early half and latter half of the compression stroke may be defined by evenly dividing the compression stroke into two in terms of the crank angle. For example, the first-stage injection may start the fuel injection at 100° CA before CTDC, and the second-stage injection may start the fuel injection at 70° CA before CTDC.

The injector 6 has a plurality of nozzle ports of which nozzle port axes are inclined with respect to the center axis X1 of the cylinder 11 (i.e., cylindrical axis), and injects the fuel to spread radially outwardly from the center portion of the combustion chamber 17. When the injector 6 performs the first-stage injection in the early half of the compression stroke, since the piston 3 is separated from TDC, the injected fuel spray reaches the upper surface of the piston 3 elevating toward TDC, outside the cavity 31. A section outside the cavity 31 forms a squish area 171 (see FIG. 2). The fuel injected in the first-stage injection remains in the squish area 171 while the piston 3 elevates and forms the mixture gas in the squish area 171.

When the injector 6 performs the second-stage injection in the latter half of the compression stroke, since the piston 3 is close to TDC, the injected fuel spray enters the cavity 31. The fuel injected in the second-stage injection forms the mixture gas in the section within the cavity 31. Here, the phrase "the section within the cavity 31" may mean a combination of a section from a projection plane of the opening surface of the cavity 31 on the ceiling surface of the combustion chamber 17 to the opening surface of the cavity 31 and a section inside the cavity 31. The phrase "the section within the cavity 31" may also be said to be a section of the combustion chamber 17 outside the squish area 171.

Due to injecting the fuel into the cavity 31 by the second-stage injection, the flow of gas occurs in the section within the cavity 31. If the time until the ignition timing is long, the turbulence kinetic energy inside the combustion chamber 17 attenuates as the compression stroke progresses. However, since the injection timing of the second-stage injection is close to the ignition timing compared to that of the first-stage injection, the spark plug 25 ignites the mixture gas in the section within the cavity 31 while keeping the high turbulence kinetic energy therewithin. Thus, the speed of the SI combustion increases. Since the SI combustion becomes stable when the speed of the SI combustion increases, the controllability of the CI combustion by the SI combustion improves.

By the injector 6 performing the first-stage injection and the second-stage injection, in the combustion chamber 17, a substantially homogeneous mixture gas in which the excess air ratio λ, is 1.0±0.2 is formed as a whole. Since the mixture gas is substantially homogeneous, the improvement in the fuel efficiency by reducing the unburned fuel loss and the improvement in the exhaust gas performance by avoiding the smoke generation are achieved. The excess air ratio λ, is preferably 1.0 to 1.2.

By the spark plug 25 igniting the mixture gas at the given timing before CTDC (the reference character 6023), the mixture gas combusts by flame propagation. After this combustion starts, the unburned mixture gas self-ignites and causes the CI combustion. The fuel injected in the second-stage injection mainly causes the SI combustion. The fuel injected in the first-stage injection mainly causes the CI combustion. By performing the first-stage injection on the compression stroke, the fuel injected in the first-stage injection is prevented from causing abnormal combustion, such as the pre-ignition. Moreover, the fuel injected in the second-stage injection is stably combusted by flame propagation.

Within the medium load range (1)-2, since the engine 1 performs the SPCCI combustion by setting the mixture gas to the stoichiometric air-fuel ratio, the medium load range (1)-2 may be referred to as "SPCCI λ=1 range."

Here, as illustrated in FIG. 5, the booster 44 is turned off (see "S/C OFF") within part of the low load range (1)-1 and part of the medium load range (1)-2. In detail, the booster 44 is turned off within a low speed segment of the low load range (1)-1. Within a high speed segment of the low load range (1)-1, the booster 44 is turned on to increase the boosting pressure in order to secure a required intake charge amount corresponding to the engine speed being high.

Further, within a low-load low-speed segment of the medium load range (1)-2, the booster 44 is turned off. Within a high load segment of the medium load range (1)-2, the booster 44 is turned on in order to secure the required intake charge amount corresponding to the fuel injection amount increasing. Within the high speed segment, the booster 44 is turned on in order to secure the required intake charge amount corresponding to the engine speed being high.

Note that within the high-load medium-speed range (2), the high-load low-speed range (3), and the high speed range (4), the booster 44 is turned on throughout the ranges (see "S/C ON").

(High-Load Medium-Speed Range (2))

Also when the engine 1 is operating within the high-load medium-speed range (2), the engine 1 performs the SPCCI combustion similarly to the low load range (1)-1 and the medium load range (1)-2.

A reference character 603 in FIG. 6 indicates one example of the fuel injection timings (reference characters 6031 and 6032) and the ignition timing (a reference character 6033), and the combustion waveform (a reference character 6034) when the engine 1 is operating in the operating state of the reference character 603 within the high-load medium-speed range (2) of the engine 1. As shown in FIG. 17, the first combustion mode, in which the swirl control valve is closed within the first speed range, in which SI combustion in which mixture gas formed in the combustion chamber combusts by flame propagation starts and then CI combustion in which unburned mixture gas combusts by compression ignition is performed, corresponds to reference character 603.

The EGR system 55 introduces the EGR gas into the combustion chamber 17 when the operating state of the engine 1 is within the high-load medium-speed range (2). The engine 1 reduces the EGR gas amount as the engine load increases. At the full load, the EGR gas may be set to zero.

Also when the engine 1 operates within the high-load medium-speed range (2), similarly to the low load range (1)-1, a strong swirl flow at a swirl ratio of 4 or above is formed in the combustion chamber 17. The SCV 56 is fully closed or has a given narrow opening.

When the engine 1 operates within the high-load medium-speed range (2), the air-fuel ratio (A/F) of the mixture gas is at or richer than the stoichiometric air-fuel ratio in the entire combustion chamber 17 (i.e., the excess air ratio $\lambda$ of the mixture gas is $\lambda \leq 1$).

When the engine 1 operates within the high-load medium-speed range (2), the injector 6 injects the fuel into the combustion chamber 17 on the compression stroke in two stages, the first-stage injection (i.e., a first injection, the reference character 6031) and the second-stage injection (i.e., a second injection, the reference character 6032). The first-stage injection may be performed, for example, in the early half of the compression stroke, and the second-stage injection may be performed, for example, in the latter half of the compression stroke. For example, the first-stage injection may start the fuel injection at 125° CA before CTDC, and the second-stage injection may start the fuel injection at 85° CA before CTDC.

Figure 9:
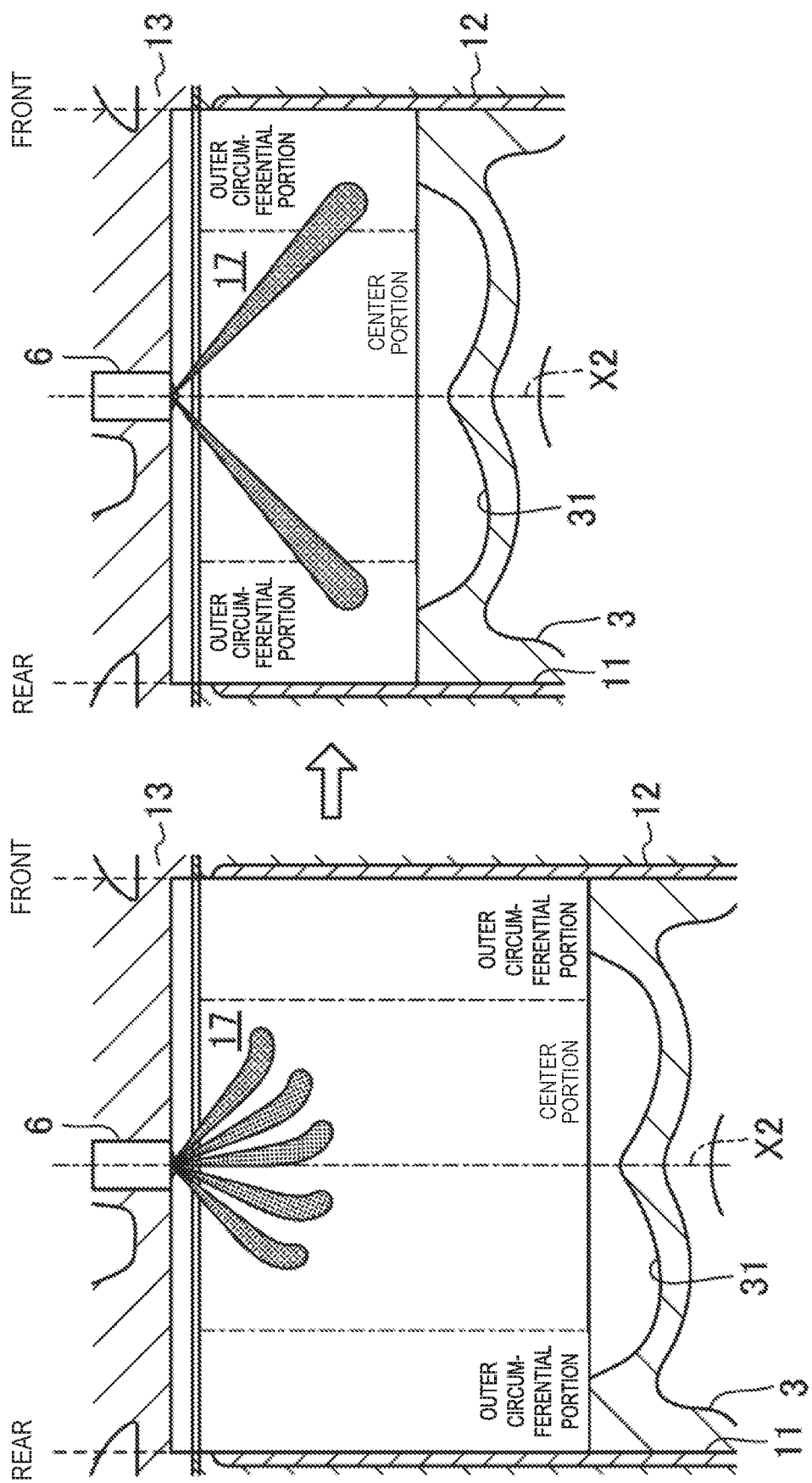
FIG. 9 shows diagrams illustrating a state of the combustion chamber when a first injection is performed and a state of the combustion chamber when a second injection is performed within a high-load medium-speed range.

In a case where a strong swirl flow is generated in the combustion chamber 17, when the first-stage injection is performed in the early half of the compression stroke, the fuel injected into the combustion chamber 17 is bent by the swirl flow as illustrated in the left diagram of FIG. 9, which causes a weaker penetration. The fuel of the first-stage injection remains in the center portion of the combustion chamber 17 and mainly forms the mixture gas therein. This mixture gas in the center portion is combusted mainly in the SI combustion as described later.

In this regard, as illustrated in the right diagram of FIG. 9, when the second-stage injection is performed in the latter half of the compression stroke, the piston elevates and the swirl flow is deteriorated in the latter half of the compression stroke, which allows the fuel injected into the combustion chamber 17 to reach the outer circumferential portion of the combustion chamber 17. The fuel of the second-stage injection mainly forms the mixture gas in the outer circumferential portion of the combustion chamber 17. This mixture gas in the outer circumferential portion is combusted mainly in the CI combustion as described later.

Further, by the fuel injection including the first-stage injection and the second-stage injection, the fuel concentration of the mixture gas in the outer circumferential portion of the combustion chamber 17 is made higher than the fuel concentration of the mixture gas in the center portion, and the fuel amount of the mixture gas in the outer circumferential portion is made larger than that in the center portion. The injection amount of the first-stage injection may be set larger than that of the second-stage injection. The ratio between the injection amount of the first-stage injection and the injection amount of the second-stage injection may be, for example, 7:3.

Figure 10:
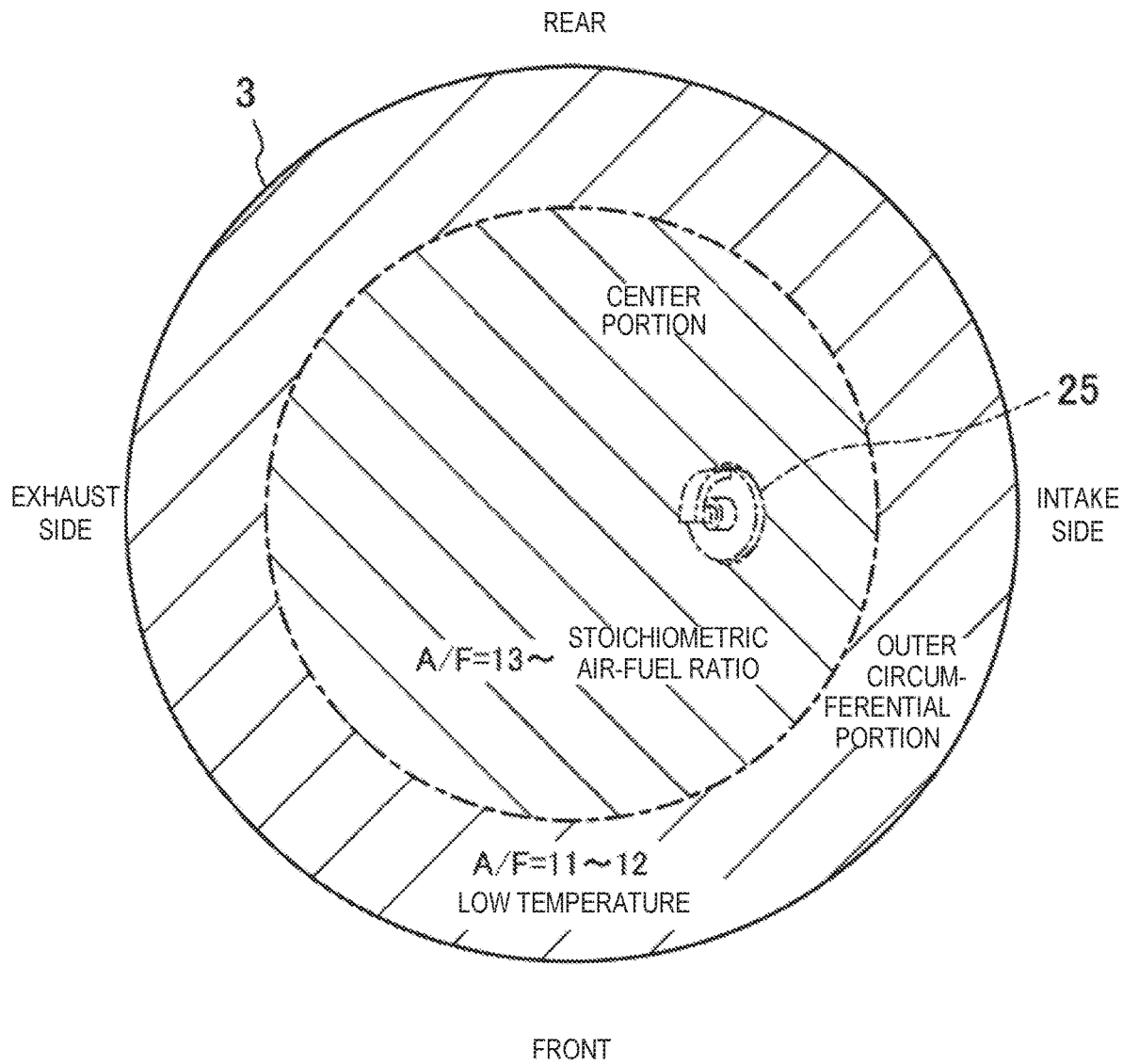
FIG. 10 is a diagram illustrating a mixture gas distribution inside the combustion chamber within the high-load medium-speed range.

When the engine 1 operates within the high-load medium-speed range (2), for example, as illustrated in FIG. 10, the excess air ratio $\lambda$ of the mixture gas in the center portion where the spark plug 25 is disposed is preferably 1 or below, and the excess air ratio $\lambda$ of the mixture gas in the outer circumferential portion is 1 or below, preferably below 1. The air-fuel ratio (A/F) of the mixture gas in the center portion may be, for example, between 13:1 and the stoichiometric air-fuel ratio (14.7:1). The air-fuel ratio of the mixture gas in the center portion may be leaner than the stoichiometric air-fuel ratio. Further, the air-fuel ratio of the mixture gas in the outer circumferential portion may be, for example, between 11:1 and the stoichiometric air-fuel ratio, preferably between 11:1 and 12:1. Since the amount of fuel within the mixture gas increases in the outer circumferential portion when the excess air ratio $\lambda$ of the outer circumferential portion of the combustion chamber 17 is set to below 1, the temperature is lowered by latent heat of vaporization of the fuel. The air-fuel ratio of the mixture gas in the entire combustion chamber 17 may be between 12.5:1 and the stoichiometric air-fuel ratio, preferably between 12.5:1 and 13:1.

The spark plug 25 ignites the mixture gas in the center portion of the combustion chamber 17 near CTDC (the reference character 6033). Since the spark plug 25 is disposed in the center portion of the combustion chamber 17, the ignition of the spark plug 25 causes the mixture gas in the center portion to start the SI combustion by flame propagation.

Within the high load range, the fuel injection amount increases as well as the temperature of the combustion chamber 17 rises, therefore the CI combustion is likely to start early. In other words, within the high load range, the pre-ignition of the mixture gas is likely to occur. However, since the temperature of the outer circumferential portion of the combustion chamber 17 is lowered by the latent heat of vaporization of the fuel as described above, the CI combustion is avoided from starting immediately after the mixture gas is spark-ignited.

Figure 11:
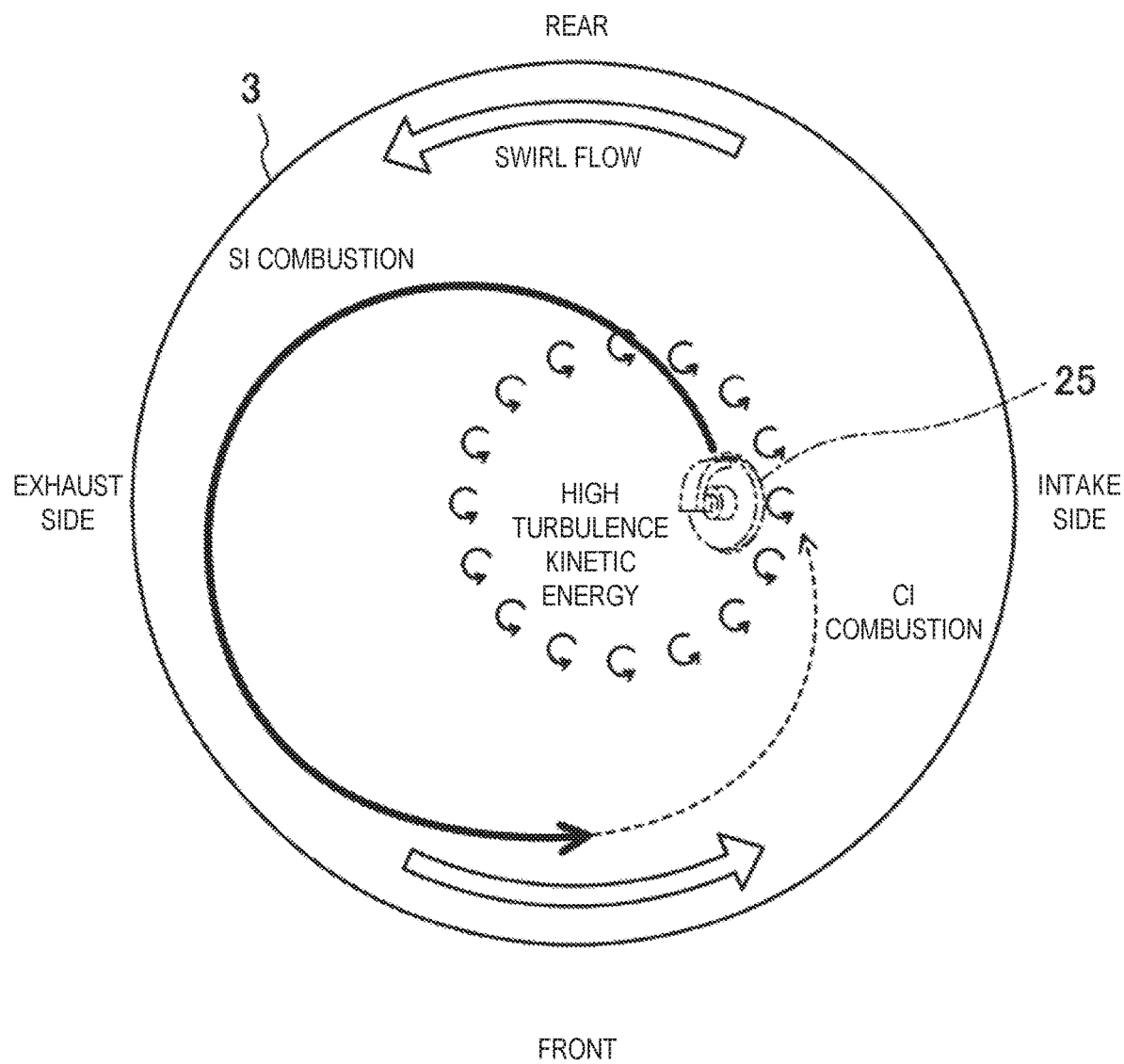
FIG. 11 is a diagram illustrating a combustion concept within the high-load medium-speed range.

FIG. 11 illustrates a combustion concept within the high-load medium-speed range (2). When the strong swirl flow is generated in the combustion chamber 17, as indicated by outlined arrows in FIG. 11, the swirl flow has a strong stream in the outer circumferential portion of the combustion chamber 17. On the other hand, the swirl flow has a relatively weak stream in the center portion, and by a whirling flow caused by a velocity gradient in a boundary between the center portion and the outer circumferential portion, the center portion has higher turbulence kinetic energy.

When the spark plug 25 ignites the mixture gas in the center portion as described above, the combustion speed increases and the SI combustion is stabilized by the high turbulence kinetic energy, and, as indicated by the black arrow in FIG. 11, the flame of the SI combustion propagates in the circumferential direction along the strong swirl flow inside the combustion chamber 17. When the internal space of the combustion chamber 17 is divided into four sections of an intake-rear section, an exhaust-rear section, an exhaust-front section, and an intake-front section, the spark plug 25 is disposed on the intake side in terms of the intake-exhaust directions. Additionally, since the swirl flow is directed in the counterclockwise direction in FIG. 11, the flame of the SI combustion flows from the intake-rear section to the intake-front side section through the exhaust-rear section and the exhaust-front section. The heat generation in the SI combustion and pressure increase by flame propagation causes the unburned mixture gas to ignite by compression in the outer circumferential portion of the intake-front section as indicated by the dashed arrow in FIG. 11, and the CI combustion is started.

In the concept of this SPCCI combustion, by the combination of stratifying the mixture gas in the combustion chamber 17 and causing the strong swirl flow inside the combustion chamber 17, the SI combustion is sufficiently performed until the CI combustion starts. As a result, the generation of combustion noise is reduced and, since the combustion temperature does not become excessively high, generation of $NO_x$ is also reduced. Further, the variation in torque between cycles is reduced.

Further, since the temperature in the outer circumferential portion is low, the CI combustion becomes slower and the generation of the combustion noise is reduced. Moreover, since the combustion period is shortened by the CI combustion, within the high load range, the torque improves and also the thermal efficiency improves. Thus, by performing the SPCCI combustion within the high engine load range, the engine 1 is improved in the fuel efficiency while avoiding the combustion noise.

Figure 12:
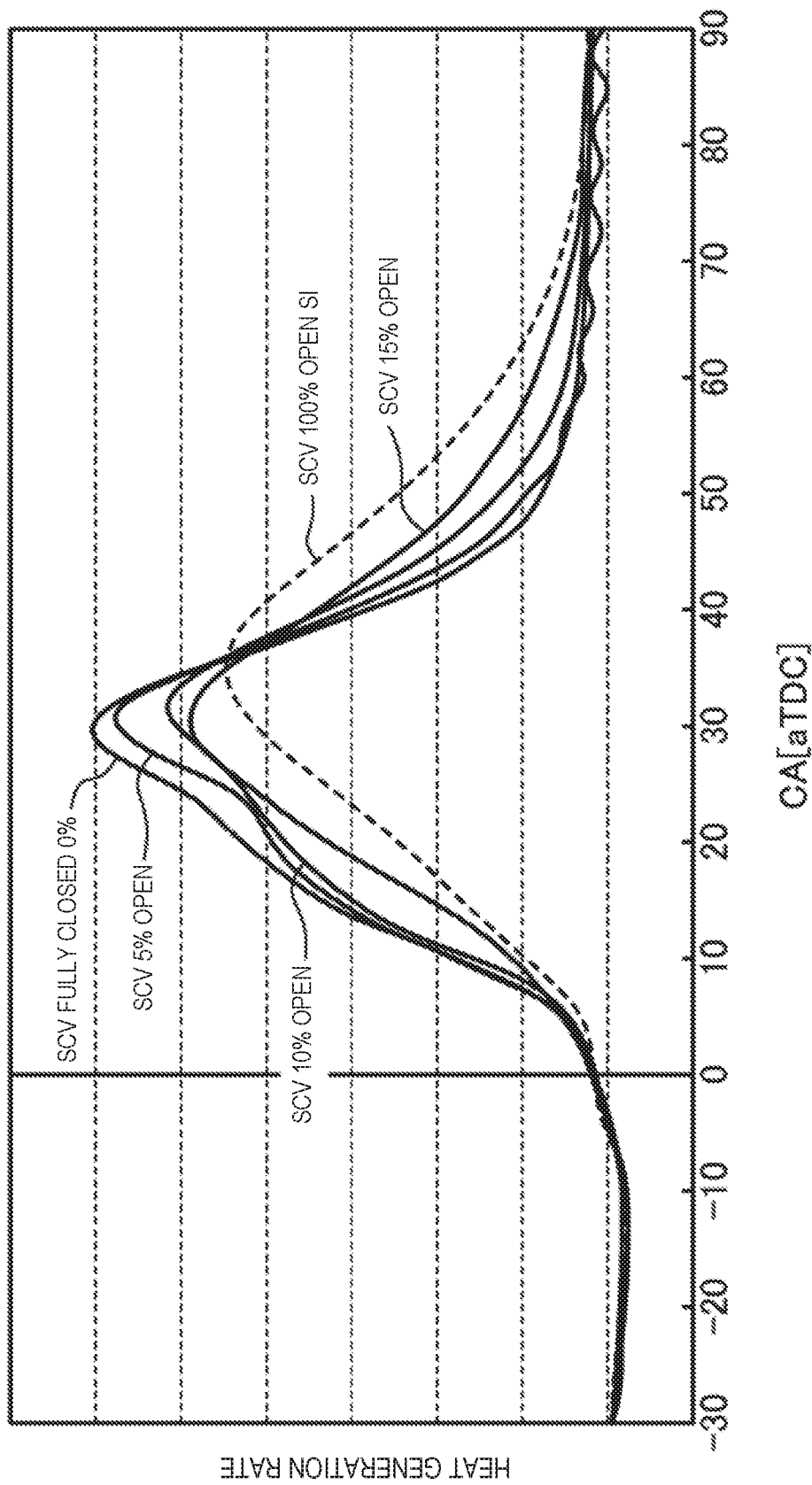
FIG. 12 is a chart illustrating a comparison of combustion waveforms when an opening of a swirl control valve is changed within the high-load medium-speed range.

Here, FIG. 12 illustrates a comparison of combustion waveforms of the SPCCI combustion when the opening of the SCV is changed within the high-load medium-speed range (2). The combustion waveform indicates the change in the heat generation rate with respect to the change in the crank angle. Similarly to FIG. 8, the opening of the SCV 56 is expressed by the opening ratio with respect to the cross section of the secondary passage 402 when fully opened.

First, as indicated by the dashed line of FIG. 12, when the SCV 56 is fully opened (i.e., the opening ratio is 100%), the swirl flow is not generated in the combustion chamber 17. After the spark plug 25 ignites the mixture gas, the combustion by flame propagation starts gently. With no swirl flow generated, the CI combustion does not occur and only the SI combustion occurs. As a result, a center of gravity of combustion is located away from CTDC and the combustion period becomes long.

When the SCV 56 is fully closed (i.e., the opening ratio is 0%) or opened by 5% or 10%, in the combustion waveform, the SI combustion starts sharper than when the SCV 56 is fully opened. The combustion speed of the SI combustion increases. Further, when the swirl flow is generated, the CI combustion occurs after the SI combustion is started. By performing the SPCCI combustion, the center of gravity of combustion approaches from CTDC and the combustion period becomes short.

When the opening of the SCV 56 is 15%, in the combustion waveform, the SI combustion starts gently. Then the CI combustion occurs, although the combustion period becomes relatively long.

It can be understood from FIG. 12 that setting the opening of the SCV 56 below 15% is effective in bringing the center of gravity of combustion close to CTDC and shortening the combustion period. Further, as illustrated in FIG. 8, by setting the opening of the SCV 56 below 15%, the swirl ratio becomes 4 or above. Therefore, when the engine 1 is operating within the high-load medium-speed range (2), by setting the opening of the SCV 56 below 15% (i.e., 0% to 15%) and the swirl ratio 4 or above (i.e., about 4 to 6), the SPCCI combustion is suitably performed.

Since the engine 1 performs the SPCCI combustion by setting the mixture gas to or richer than the stoichiometric air-fuel ratio within the high-load medium-speed range (2), the high-load medium-speed range (2) may be referred to as "SPCCI $\lambda \leq 1$ range."

(High-Load Low-Speed Range (3))

When the engine speed is low, the time length for the crank angle to change 1° becomes longer. Within the high-load low-speed range (3), if the fuel is injected into the combustion chamber 17 in the intake stroke and the early half of the compression stroke similarly to within the high-load medium-speed range (2), the reaction of the fuel excessively progresses and causes pre-ignition. When the engine 1 is operating within the high-load low-speed range (3), it becomes difficult to perform the SPCCI combustion.

When the engine 1 is operating within the high-load low-speed range (3), the engine 1 performs the SI combustion instead of the SPCCI combustion.

A reference character 604 in FIG. 6 indicates one example of the fuel injection timing (a reference character 6041) and the ignition timing (a reference character 6042), and the combustion waveform (a reference character 6043) when the engine 1 is operating in the operating state 604 within the high-load low-speed range (3).

The EGR system 55 introduces the EGR gas into the combustion chamber 17 when the operating state of the engine 1 is within the high-load low-speed range (3). The engine 1 reduces the EGR gas amount as the engine load increases. At the full load, the EGR gas may be set to zero.

When the engine 1 is operating within the high-load low-speed range (3), the air-fuel ratio (A/F) of the mixture gas is at the stoichiometric air-fuel ratio (A/F=14.7:1) in the entire combustion chamber 17. The A/F of the mixture gas may be set to remain within the purification window of the three-way catalyst. Therefore, the excess air ratio λ of the mixture gas may be 1.0±0.2. By setting the air-fuel ratio of the mixture gas to the stoichiometric air-fuel ratio, the fuel efficiency improves within the high-load low-speed range (3). Note that when the engine 1 operates within the high-load low-speed range (3), the fuel concentration of the mixture gas in the entire combustion chamber 17 may be set so that the excess air ratio λ is 1 or less and equal to or higher than the excess air ratio λ within the high-load medium-speed range (2), preferably higher than the excess air ratio λ within the high-load medium-speed range (2).

When the engine 1 operates within the high-load low-speed range (3), the injector 6 injects the fuel into the combustion chamber 17 at a timing in the period from a final stage of the compression stroke to an early stage of the expansion stroke (hereinafter, referred to as "retard period") (the reference character 6041). The final stage of the compression stroke may be the final stage when the compression stroke is evenly divided into three stages of an early stage, an intermediate stage, and the final stage. The early stage of the expansion stroke may be the early stage when the expansion stroke is evenly divided into three stages of the early stage, an intermediate stage, and a final stage.

By setting the fuel injection timing to a late timing, pre-ignition is avoided. The fuel pressure is set to a high fuel pressure of 30 MPa or above. By increasing the fuel pressure, the fuel injection period and the mixture gas formation period are shortened. An upper limit of the fuel pressure may be, for example, 120 MPa.

After the fuel is injected, the spark plug 25 ignites the mixture gas at the timing near CTDC (the reference character 6042). The spark plug 25 may ignite, for example, after CTDC. The mixture gas causes the SI combustion on the expansion stroke. Since the SI combustion starts on the expansion stroke, the CI combustion does not start.

In order to avoid the pre-ignition, the injector 6 retards the fuel injection timing as the engine speed decreases. The fuel injection may end on the expansion stroke.

When the engine 1 operates within the high-load low-speed range (3), the time length from the start of the fuel injection until the ignition is short. In order to improve the ignitability of the mixture gas and to stabilize the SI combustion, the fuel needs to be promptly conveyed to near the spark plug 25.

Figure 13:
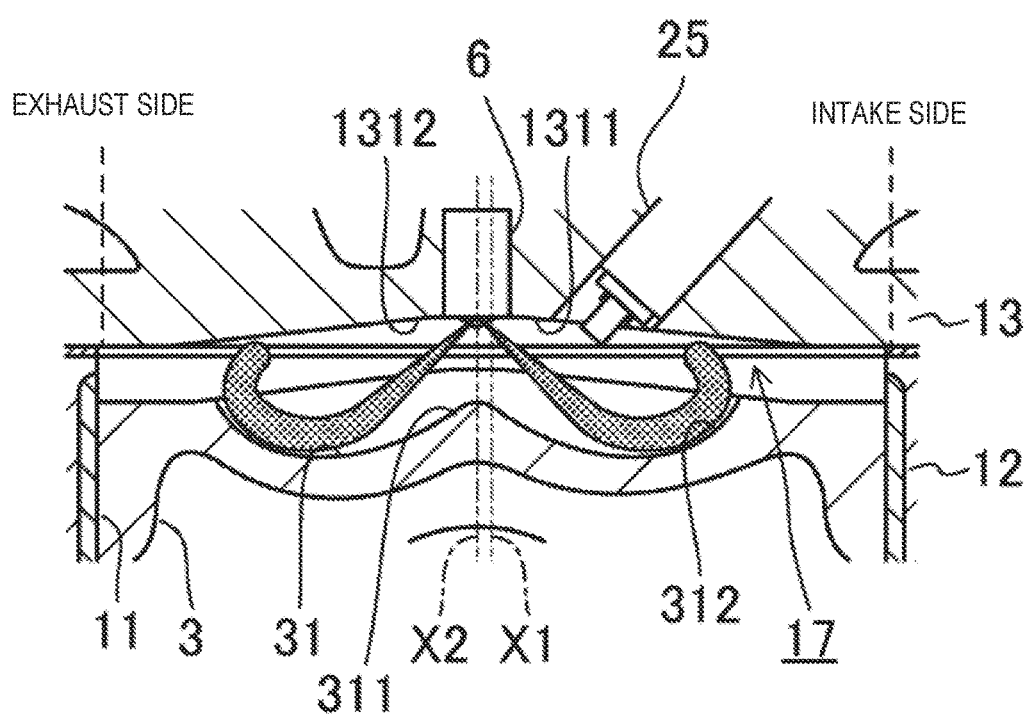
FIG. 13 is a diagram illustrating a state of the combustion chamber when a fuel injection is performed within a high-load low-speed range.

As illustrated in FIG. 13, when the injector 6 injects the fuel in the period from the final stage of the compression stroke to the early stage of the expansion stroke, since the piston 3 is located near CTDC, the fuel spray flows downward along the convex section 311 of the cavity 31 while mixing with fresh air, and flows along the bottom surface and the circumferential surface of the cavity 31 to spread radially outward from the center of the combustion chamber 17. Then, the mixture gas reaches the opening of the cavity 31, flows along the inclined surface 1311 on the intake side and the inclined surface 1312 on the exhaust side, and further flows from the outer circumferential side toward the center of the combustion chamber 17. Thus, the fuel injected in the retard period is promptly conveyed to near the spark plug 25.

Further, when the engine 1 operates within the high-load low-speed range (3), the swirl flow is made weaker than when operating within the high-load medium-speed range (2). When the engine 1 operates within the high-load low-speed range (3), the opening of the SCV 56 is larger than when operating within the high-load medium-speed range (2). The opening of the SCV 56 may be, for example, about 50% (i.e., half opened).

As illustrated in the upper chart of FIG. 2, the axes of the nozzle ports of the injector 6 do not circumferentially overlap with the spark plug 25. The fuel injected from the nozzle ports flows in the circumferential direction due to the swirl flow inside the combustion chamber 17. By the swirl flow, the fuel is promptly conveyed to near the spark plug 25. The fuel is vaporized while being conveyed to near the spark plug 25.

On the other hand, if the swirl flow is excessively strong, the fuel flows in the circumferential direction and reaches away from the spark plug 25, and the fuel cannot promptly be conveyed near the spark plug 25. For this reason, when the engine 1 operates within the high-load low-speed range (3), the swirl flow is made weaker than when operating within the high-load medium-speed range (2). As a result, the fuel is promptly conveyed to near the spark plug 25, thus the ignitability of the mixture gas improves and the SI combustion stabilizes.

Within the high-load low-speed range (3), since the engine 1 performs the SI combustion by injecting the fuel in the retard period from the final stage of the compression stroke to the early stage of the expansion stroke, the high-load low-speed range (3) may be referred to as "retarded SI range."

(High Speed Range (4))

When the engine speed is high, the time length for the crank angle to change 1° becomes shorter. Therefore, for example, within a high speed segment of the high load range, it is difficult to stratify the mixture gas in the combustion chamber 17 by performing the split injections during the compression stroke as described above. When the engine speed increases, it becomes difficult to perform the SPCCI combustion described above.

When the engine 1 is operating within the high speed range (4), the engine 1 performs the SI combustion instead of the SPCCI combustion. Note that the high speed range (4) extends over the entire load direction from low load to high loads.

A reference character 605 in FIG. 6 indicates one example of the fuel injection timing (a reference character 6051) and the ignition timing (a reference character 6052), and the combustion waveform (a reference character 6053) when the engine 1 is operating in the operating state of the reference character 605 within the high speed range (4) of the engine 1. As shown in FIG. 17, the second combustion mode, in which the swirl control valve is open within the second speed range and only SI combustion is performed by flame propagation, corresponds to reference character 605.

The EGR system 55 introduces the EGR gas into the combustion chamber 17 when the operating state of the engine 1 is within the high speed range (4). The engine 1 reduces the EGR gas amount as the engine load increases. At the full load, the EGR gas may be set to zero.

When operating within the high speed range (4), the engine 1 fully opens the SCV 56. No swirl flow is generated in the combustion chamber 17, and only the tumble flow is generated. By fully opening the SCV 56, the charging efficiency is improved in the high speed range (4) and a pumping loss is reduced.

When the engine 1 operates within the high speed range (4), the air-fuel ratio (A/F) of the mixture gas is basically at the stoichiometric air-fuel ratio (A/F=14.7:1) in the entire combustion chamber 17. The excess air ratio λ of the mixture gas may be set to 1.0±0.2. Note that within the high load segment of the high speed range (4) including the full load, the excess air ratio λ of the mixture gas may be below 1.

When the engine 1 operates within the high speed range (4), the injector 6 starts the fuel injection on the intake stroke. The injector 6 injects all the fuel portion for one combustion cycle in a lump. Note that in the operating state 605, since the engine load is high, the fuel injection amount is large. The fuel injection period changes according to the fuel injection amount. By starting the fuel injection on the intake stroke, homogeneous or substantially homogeneous mixture gas is formed in the combustion chamber 17. Further, when the engine speed is high, since the evaporation time of the fuel is secured as long as possible, the unburned fuel loss and generation of soot are reduced.

After the fuel injection is ended, the spark plug 25 ignites the mixture gas at a suitable timing before CTDC (the reference character 6052).

Within the high speed range (4), since the engine 1 starts the fuel injection on the intake stroke and performs the SI combustion, the high speed range (4) may be referred to as "intake SI range."

(Comparison of Engine Control within Each Operating Range)

First, when comparing the low load range (1)-1 to the high-load medium-speed range (2), as illustrated in the map 501 of FIG. 5, within the low load range (1)-1, the excess air ratio λ of the mixture gas is set above 1, whereas within the high-load medium-speed range (2), the excess air ratio λ of the mixture gas is set to 1 or below. Thus, within the low load range (1)-1, the fuel efficiency is improved while within the high-load medium-speed range (2), an extended torque feel is obtained.

Further within the low load range (1)-1, the fuel concentration of the mixture gas in the center portion of the combustion chamber 17 is higher than that in the outer circumferential portion. On the other hand, within the high-load medium-speed range (2), the fuel concentration of the mixture gas in the outer circumferential portion of the combustion chamber 17 is higher than that in the center portion. Within the low load range (1)-1, since the fuel concentration of the mixture gas to be ignited is high, the ignitability of the SI combustion is improved and the SI combustion is stabilized. Within the high-load medium-speed range (2), it is avoided that the temperature of the outer circumferential portion drops and the CI combustion starts early. Therefore, the CI combustion starts after sufficiently performing the SI combustion, which is advantageous in reducing the combustion noise and a variation in torque between combustion cycles.

Note that the timing of closing the SCV 56 is the same between the low load range (1)-1 and the high-load medium-speed range (2).

Next, when comparing the high-load low-speed range (3) to the high-load medium-speed range (2), as illustrated in FIG. 6, within the high-load medium-speed range (2), the plurality of fuel injections are performed on the compression stroke, whereas within the high-load low-speed range (3), the fuel is injected into the combustion chamber in the period from the final stage of the compression stroke to the early stage of the expansion stroke, which is later than the injection start timing of the high-load medium-speed range (2). Within the high-load medium-speed range (2), the mixture gas is stratified in the center portion and the outer circumferential portion of the combustion chamber 17. Within the high-load low-speed range (3), pre-ignition is avoided.

Further, as illustrated in the map 501 of FIG. 5, within the high-load low-speed range (3), the excess air ratio λ of the mixture gas is set to substantially 1, whereas within the high-load medium-speed range (2), the excess air ratio λ of the mixture gas is set to 1 or below. Within the high-load low-speed range (3), a torque improvement and the fuel efficiency improvement are both achieved, whereas within the high-load medium-speed range (2) in which the engine speed is relatively high, the extended torque feel is obtained.

Further within the high-load low-speed range (3), the SCV 56 is half opened. On the other hand, within the high-load medium-speed range (2), the SCV 56 is closed. Within the high-load low-speed range (3), the swirl flow is made weak so that the fuel spray is promptly conveyed to near the spark plug 25, and the ignitability and stability of the SI combustion are improved while avoiding the pre-ignition. On the other hand, within the high-load medium-speed range (2), the swirl flow is enhanced so that the SI combustion is sufficiently performed in the SPCCI combustion, which is advantageous in reducing the combustion noise and improving fuel efficiency.

Next, when comparing the high speed range (4) to the high-load medium-speed range (2), as illustrated in FIG. 6, within the high-load medium-speed range (2), the plurality of fuel injections are performed on the compression stroke, whereas within the high speed range (4), the fuel injection is started at a timing advanced than the injection start timing of the high-load medium-speed range (2). Within the high-load medium-speed range (2), the mixture gas is stratified in the center portion and the outer circumferential portion of the combustion chamber 17. Within the high speed range (4), the homogeneous or substantially homogeneous mixture gas is formed, an unburned fuel loss is reduced and a soot generation is reduced.

Further, as illustrated in the map 502 of FIG. 5, the SCV 56 is fully opened within the high speed range (4), while the SCV 56 is closed within the high-load medium-speed range (2). Within the high speed range (4), a pump loss is reduced by not closing the SCV 56. On the other hand, within the high-load medium-speed range (2), the swirl flow is enhanced so that the SI combustion is sufficiently performed in the SPCCI combustion, which is advantageous in reducing the combustion noise and improving fuel efficiency.

Next, when comparing the medium load range (1)-2 to the high-load low-speed range (3), as illustrated in the map 502 of FIG. 5, the SCV 56 is fully closed within the medium load range (1)-2, while the SCV 56 is half opened within the high-load low-speed range (3). Within the medium load range (1)-2, by closing the SCV 56, the SI combustion is sufficiently performed in the SPCCI combustion, which is advantageous in reducing the combustion noise and improving fuel efficiency. On the other hand, within the high-load low-speed range (3), by making the swirl flow weak, as described above, the ignitability of the SI combustion and the stability of the SI combustion are improved.

Further as illustrated in FIG. 6, within the medium load range (1)-2, the first-stage injection is performed in the early half of the compression stroke and the second-stage injection is performed in the latter half of the compression stroke, whereas within the high-load low-speed range (3), the fuel is injected into the combustion chamber in the period from the final stage of the compression stroke to the early stage of the expansion stroke. Within the medium load range (1)-2, the homogeneous or substantially homogeneous mixture gas is formed in the combustion chamber 17 entirely. Within the high-load low-speed range (3), the pre-ignition is avoided.

(Control Process of Engine)

Next, an operation control of the engine 1 executed by the ECU 10 will be described with reference to the flowchart of FIG. 14. First at SI after the start, the ECU reads the signals from the sensors SW1 to SW16. Next at S2, the ECU 10 determines the operating range of the engine 1.

At S3, the ECU 10 determines whether the engine 1 operates within "SPCCI lean range" (i.e., low load range (1)-1). If the result is positive, the process proceeds to S8, whereas if the result is negative, the process proceeds to S4.

At S4, the ECU 10 determines whether the engine 1 operates within "SPCCI λ=1 range" (i.e., medium load range (1)-2). If the result is positive, the process proceeds to S9, whereas if the result is negative, the process proceeds to S5.

At S5, the ECU 10 determines whether the engine 1 operates within "SPCCI λ≤1 range" (i.e., high-load medium-speed range (2)). If the result is positive, the process proceeds to S10, whereas if the result is negative, the process proceeds to S6.

At S6, the ECU 10 determines whether the engine 1 operates within "retarded SI range" (i.e., high-load low-speed range (3)). If the result is positive, the process proceeds to S11, whereas if the result is negative, the process proceeds to S7.

At S7, the ECU 10 determines whether the engine 1 operates within "intake SI range" (i.e., high speed range (4)). If the result is positive, the process proceeds to S12, whereas if the result is negative, the process returns to S1.

At S8, the ECU 10 outputs a control signal to the SCV 56 to close itself. Further, as indicated by the reference character 601 of FIG. 6, the ECU 10 outputs a control signal to the injector 6 to perform the first-stage injection on the intake stroke and perform the second-stage injection on the compression stroke. Thus, stratified mixture gas is formed in the combustion chamber 17 where the strong swirl flow is generated. Then at S13, the ECU 10 outputs a control signal to the spark plug 25 to perform the ignition at a given timing before CTDC. Thus, the engine 1 performs the SPCCI combustion.

At S9, the ECU 10 outputs a control signal to the SCV 56 to close itself. Further, as indicated by the reference character 602 of FIG. 6, the ECU 10 outputs a control signal to the injector 6 to perform the first-stage injection and the second-stage injection on the compression stroke. Thus, the mixture gas at λ=1 is formed in the combustion chamber 17 where the strong swirl flow is generated. Then at S13, the ECU 10 outputs a control signal to the spark plug 25 to perform the ignition at a given timing before CTDC. Thus, the engine 1 performs the SPCCI combustion.

At S10, the ECU 10 outputs a control signal to the SCV 56 to close itself. Further, the ECU 10 outputs a control signal to the injector 6 to perform the split injections of the fuel on the compression stroke (see the reference characters 6031 and 6032). Thus, stratified mixture gas is formed in the combustion chamber 17 where the strong swirl flow is generated. Then at S13, the ECU 10 outputs a control signal to the spark plug 25 to perform the ignition at a given timing before CTDC. Thus, the engine 1 performs the SPCCI combustion.

At S11, the ECU 10 outputs a control signal to the SCV 56 to open half. Further, at S13, as indicated by the reference character 604 of FIG. 6, the ECU 10 outputs a control signal to the injector 6 to perform the fuel injection from the final stage of the compression stroke to the early stage of the expansion stroke. The ECU 10 outputs a control signal to the spark plug 25 to perform the ignition at a given timing after the fuel injection and after CTDC. Thus, the engine 1 performs the SI combustion.

At S12, the ECU 10 outputs a control signal to the SCV 56 to open. Further, the ECU 10 outputs a control signal to the injector 6 to perform the fuel injection on the intake stroke. Thus, the homogeneous or substantially homogeneous mixture gas is formed in the combustion chamber 17. Then at S13, the ECU 10 outputs a control signal to the spark plug 25 to perform the ignition at a given timing before CTDC. Thus, the engine 1 performs the SI combustion.

(Modification of Fuel Injection Timing and Ignition Timing within Each Range)

Figure 15:
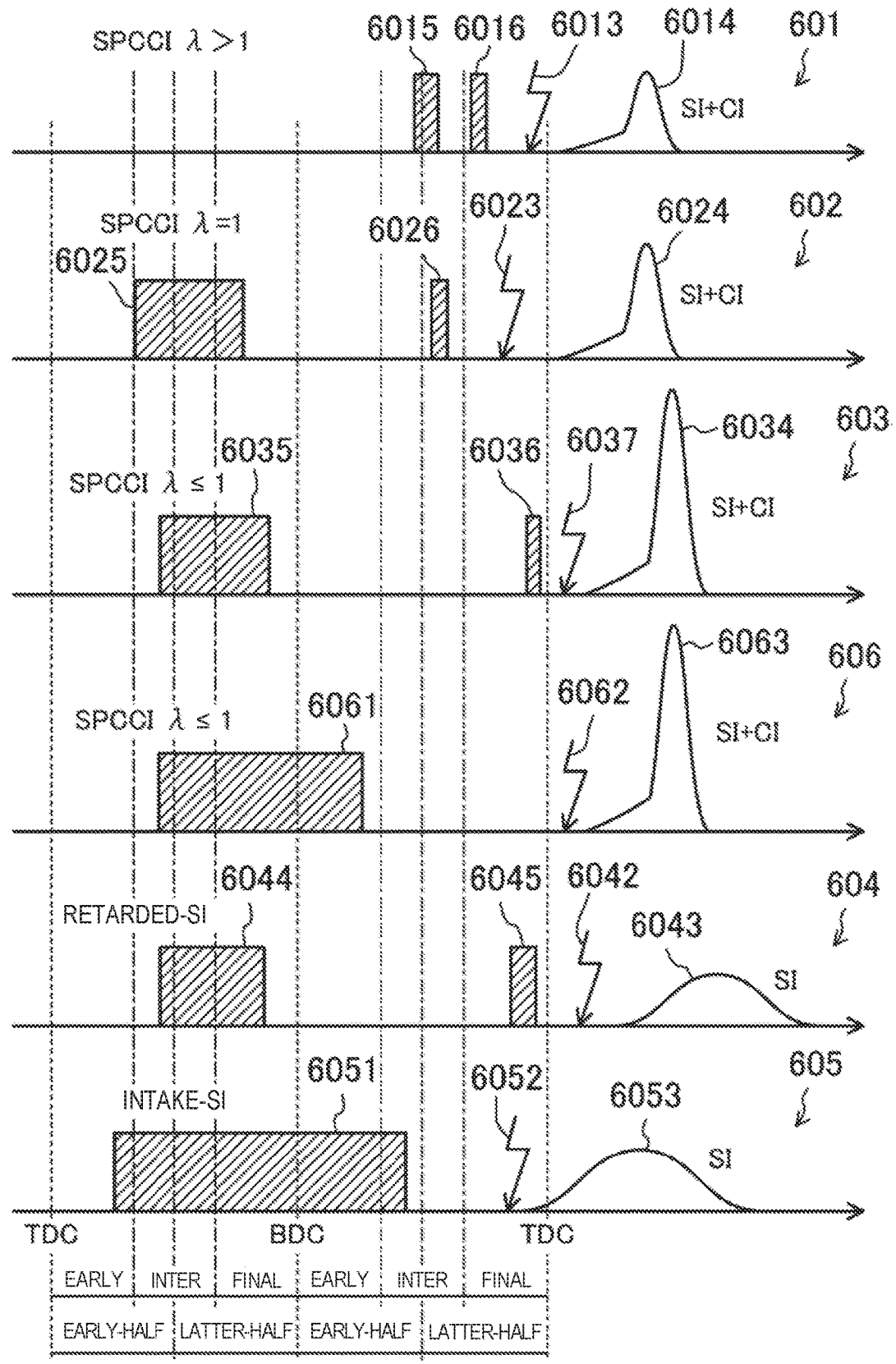
FIG. 15 shows charts illustrating a fuel injection timing, an ignition timing, and a combustion waveform in each operating range in an example different from FIG. 6.

FIG. 15 shows a modification of the fuel injection timing and the ignition timing in each range of the operating range maps 501 and 502 of FIG. 5. Reference characters 601, 602, 603, 604, 605, and 606 of FIG. 15 correspond to operating states 601, 602, 602, 603, 604, 605, and 606 of FIG. 5, respectively. The operating state 606 corresponds to an operating state where the engine speed is high within the high-load medium-speed range (2).

When the engine 1 operates in the operating state 601 of the low load range (1)-1, the injector 6 injects the fuel into the combustion chamber 17 by splitting it into in a plurality of injections on the compression stroke (see the reference characters 6015 and 6016). Similarly to the description above, the mixture gas is stratified in the center portion and the outer circumferential portion of the combustion chamber 17 by the split injections of the fuel and the strong swirl flow inside the combustion chamber 17.

After the fuel injection is ended, the spark plug 25 ignites the mixture gas in the center portion of the combustion chamber 17 at the given timing before CTDC (see the reference character 6013). Since the fuel concentration of the mixture gas in the center portion is relatively high, ignitability improves and the SI combustion by the flame propagation stabilizes. By stabilizing the SI combustion, the CI combustion starts at the suitable timing (see the combustion waveform 6014). The controllability of the CI combustion improves in the SPCCI combustion. As a result, when the engine 1 operates within the low load range (1)-1, both the reduction of the generation of combustion noise and the improvement of the fuel efficiency by the shortening of the combustion period are achieved.

When the engine 1 operates in the operating state 602 of the medium load range (1)-2, the injector 6 performs the fuel injection on the intake stroke (a reference character 6025) and the fuel injection on the compression stroke (a reference character 6026). By performing the first injection 6025 on the intake stroke, the fuel is distributed substantially evenly in the combustion chamber 17. By performing the second injection 6026 on the compression stroke, at a high engine load within the medium load range (1)-2, the temperature inside the combustion chamber 17 is lowered by the latent heat of the fuel, and thus, abnormal combustion, such as knocking, is prevented. A ratio between the injection amount of the first injection 6025 and the injection amount of the second injection 6026 may be, for example, 95:5. In the operating state where the engine load is low within the medium load range (1)-2, the second injection 6026 may be omitted.

When the injector 6 performs the first injection 6025 on the intake stroke and the second injection 6026 on the compression stroke, similarly to the description above, the mixture gas with the excess air ratio λ of 1.0±0.2 as a whole is formed in the combustion chamber 17. Since the fuel concentration of the mixture gas is substantially homogeneous, the improvement in the fuel efficiency by reducing the unburned fuel loss and the improvement in the exhaust gas performance by avoiding smoke generation are achieved. The excess air ratio λ is preferably 1.0 to 1.2.

By the spark plug 25 igniting the mixture gas at the given timing before CTDC (the reference character 6023), the mixture gas combusts by flame propagation. After the combustion by flame propagation is started, the unburned mixture gas self-ignites at the target timing and causes the CI combustion (see the combustion waveform 6024).

When the engine 1 operates in the operating state 603 at the low speed side of the high-load medium-speed range (2), the injector 6 injects the fuel on the intake stroke (a reference character 6035) and injects the fuel at a final stage of the compression stroke (a reference character 6036).

The first-stage injection 6035 starting on the intake stroke may start the fuel injection in an early half of the intake stroke. The early half of the intake stroke may be defined by evenly dividing the intake stroke into two parts of the early half and the latter half. For example, the first-stage injection may start the fuel injection at 280° CA before TDC.

Figure 16:
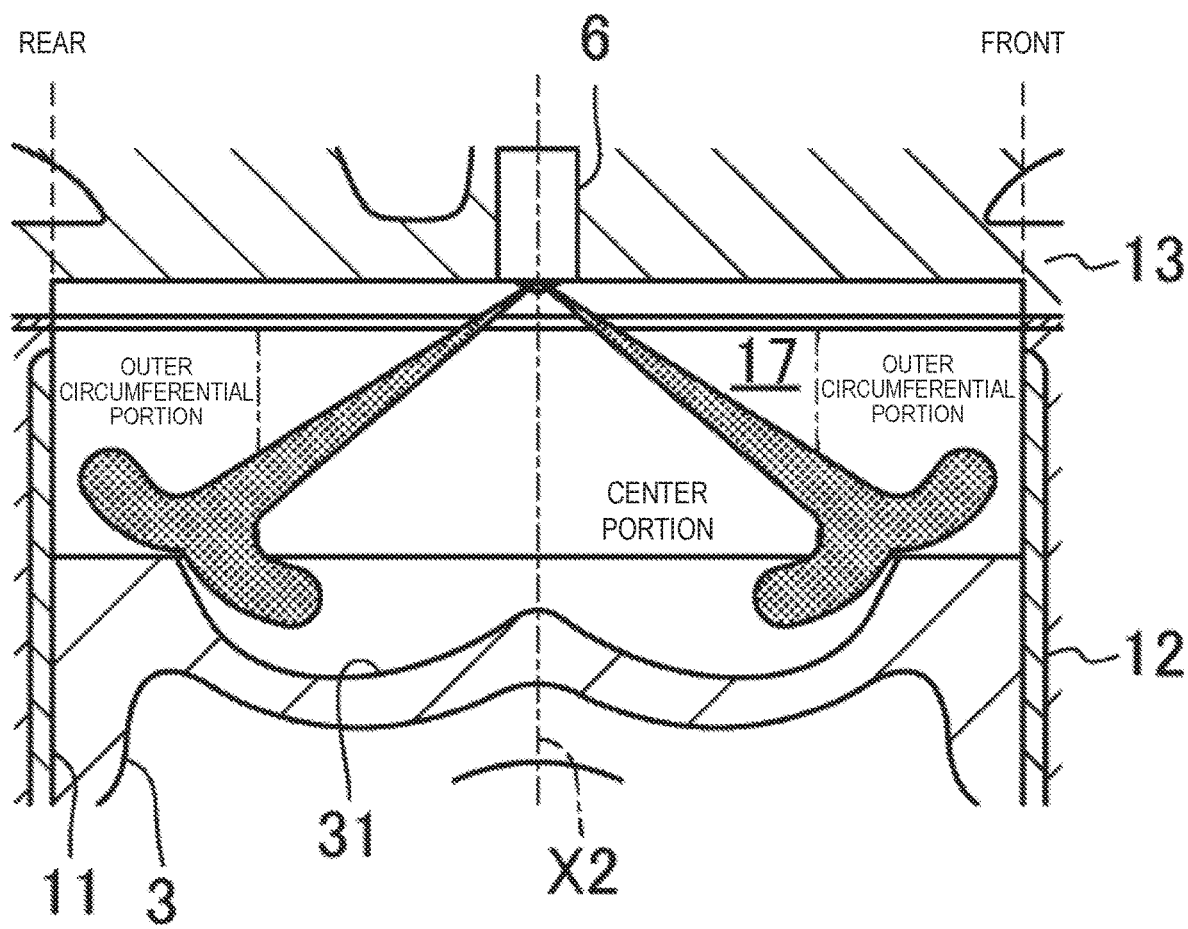
FIG. 16 is a diagram illustrating a state of the combustion chamber when a fuel injection is performed within the high-load medium-speed range of FIG. 15.

When the injection of the first-stage injection 6035 is started in the early half of the intake stroke, as illustrated in FIG. 16, the fuel spray hits an opening edge of the cavity 31 so that a portion of the fuel enters the squish area 171 of the combustion chamber 17 and the rest of the fuel enters the section within the cavity 31. The swirl flow is strong in the outer circumferential portion of the combustion chamber 17 and weak in the center portion. Therefore, the portion of the fuel that enters the squish area 171 joins the swirl flow, and the rest of the fuel that enters the section within the cavity 31 joins the inner side of the swirl flow. The fuel joined the swirl flow, remains in the swirl flow during the intake stroke and the compression stroke and forms the mixture gas for the CI combustion in the outer circumference portion of the combustion chamber 17. The fuel that enters the inner side of the swirl flow also remains at the inner side of the swirl flow during the intake stroke and the compression stroke and forms the mixture gas for the SI combustion in the center portion of the combustion chamber 17.

Similarly to the description above, the excess air ratio λ of the mixture gas in the center portion where the spark plug 25 is disposed preferably is 1 or less, and the excess air ratio λ of the mixture gas in the outer circumferential portion is 1 or less, preferably below 1. The air-fuel ratio (A/F) of the mixture gas in the center portion may be, for example, between 13:1 and the stoichiometric air-fuel ratio (14.7:1). The air-fuel ratio of the mixture gas in the center portion may be leaner than the stoichiometric air-fuel ratio. Further, the air-fuel ratio of the mixture gas in the outer circumferential portion may be, for example, between 11:1 and the stoichiometric air-fuel ratio, preferably between 11:1 and 12:1. The air-fuel ratio of the mixture gas in the entire combustion chamber 17 may be between 12.5:1 and the stoichiometric air-fuel ratio, preferably between 12.5:1 and 13:1.

The second-stage injection 6036 performed in the final stage of the compression stroke may start the fuel injection at 10° CA before TDC. By performing the second-stage injection immediately before TDC, the temperature in the combustion chamber 17 is lowered by the latent heat of vaporization of the fuel. Although a low-temperature oxidation reaction of the fuel injected by the first-stage injection 6035 progresses on the compression stroke and transitions to a high-temperature oxidation reaction before TDC, by performing the second-stage injection 6036 immediately before TDC so as to lower the temperature inside the combustion chamber, the transition from the low-temperature oxidation reaction to the high-temperature oxidation reaction is avoided and the pre-ignition is prevented. Note that the ratio between the injection amount of the first-stage injection 6035 and the injection amount of the second-stage injection 6036 may be, for example, 95:5.

The spark plug 25 ignites the mixture gas in the center portion of the combustion chamber 17 near CTDC (a reference character 6037). The spark plug 25 ignites, for example, at or after CTDC. Since the spark plug 25 is disposed in the center portion of the combustion chamber 17, the ignition of the spark plug 25 causes the mixture gas in the center portion to start the SI combustion by flame propagation. As illustrated in FIG. 11, the flame of the SI combustion propagates in the circumferential direction on a strong swirl flow inside the combustion chamber 17. At a given position of the outer circumferential portion of the combustion chamber 17 in the circumferential direction, the unburned mixture gas is compressed and ignited and the CI combustion starts (see the combustion waveform 6034).

When the engine 1 operates in the operating state 606 at the high speed side of the high-load medium-speed range (2), the injector 6 starts the fuel injection on the intake stroke (see a reference character 6061).

The first-stage injection 6061 starting on the intake stroke may start the fuel injection in the early half of the intake stroke similarly to the first-stage injection 6035 in the operating state 603. For example, the first-stage injection 6061 may start the fuel injection at 280° CA before TDC. The first-stage injection may last over the intake stroke and end on the compression stroke. By setting the start of injection of the first-stage injection 6061 in the early half of the intake stroke, the mixture gas for the CI combustion is formed in the outer circumferential portion of the combustion chamber 17 and the mixture gas for the SI combustion is formed in the center portion of the combustion chamber 17. Since abnormal combustion does not easily occur due to the high engine speed, the second-stage injection may be omitted.

The spark plug 25 ignites the mixture gas in the center portion of the combustion chamber 17 near CTDC (a reference character 6062). The spark plug 25 ignites, for example, at or after CTDC. Thus, the SPCCI combustion is performed (see a combustion waveform 6063).

When the engine 1 operates in the operating state 604 within the high-load low-speed range (3), the injector 6 injects the fuel into the combustion chamber 17 at the timings of the intake stroke and in the retard period from the final stage of the compression stroke to the early stage of the expansion stroke (see reference characters 6044 and 6045). By injecting the fuel in two injections, the amount of fuel injected in the retard period is reduced. By injecting the fuel on the intake stroke (the reference character 6044), the formation period of time of the mixture gas is sufficiently secured. Additionally, by injecting the fuel in the retard period (reference character 6045), the flow inside the combustion chamber 17 immediately before the ignition is strengthened, which is advantageous in stabilizing the SI combustion. This fuel injection mode is particularly effective when the geometric compression ratio of the engine 1 is low.

After the fuel is injected, the spark plug 25 ignites the mixture gas at a timing near CTDC (the reference character 6042). The spark plug 25 ignites, for example, after CTDC. The mixture gas causes the SI combustion on the expansion stroke. Since the SI combustion starts on the expansion stroke, the CI combustion does not start (see the combustion waveform 6043).

The fuel injection timing (the reference character 6051) and the ignition timing (the reference character 6052) when the engine 1 operates in the operating state 605 of the high speed range (4) are the same as those in FIG. 6. When the engine 1 operates within the high speed range (4), the SI combustion is performed (see the reference character 6053).

Note that the fuel injection timing and the ignition timing illustrated in FIG. 6 are exchangeable with those illustrated in FIG. 15 in the same operating range. For example, although the fuel injection timing and the ignition timing illustrated in FIG. 15 are adopted within the high-load medium-speed range (2), the fuel injection timing and the ignition timing illustrated in FIG. 6 may be adopted within the high-load low-speed range (3).

Figure 14:
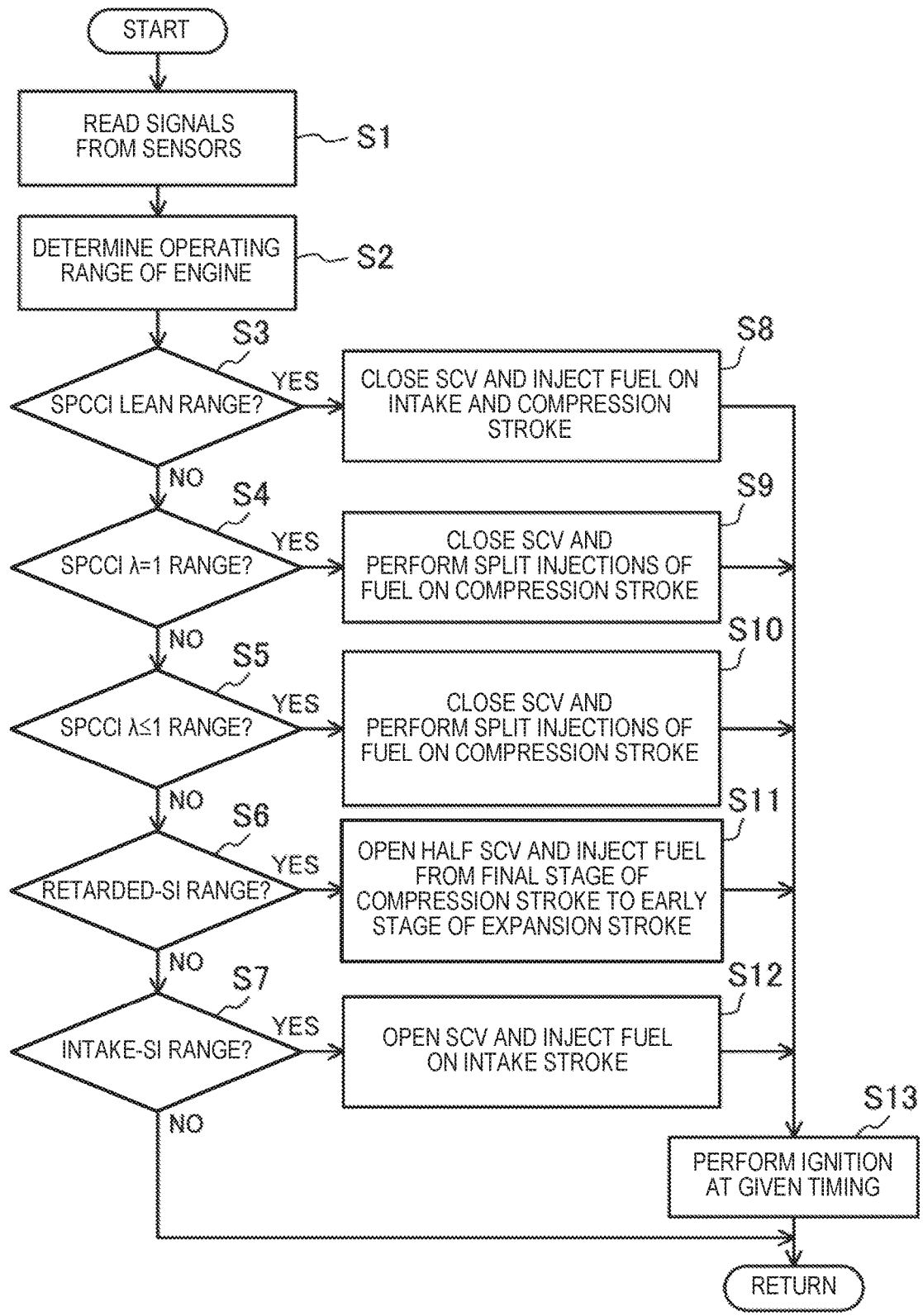
FIG. 14 is a flowchart illustrating a control process of the engine.

Moreover, in the case of adopting the fuel injection timing illustrated in FIG. 15, S8 to S12 in the flow of FIG. 14 may respectively be changed.

Figure 18:
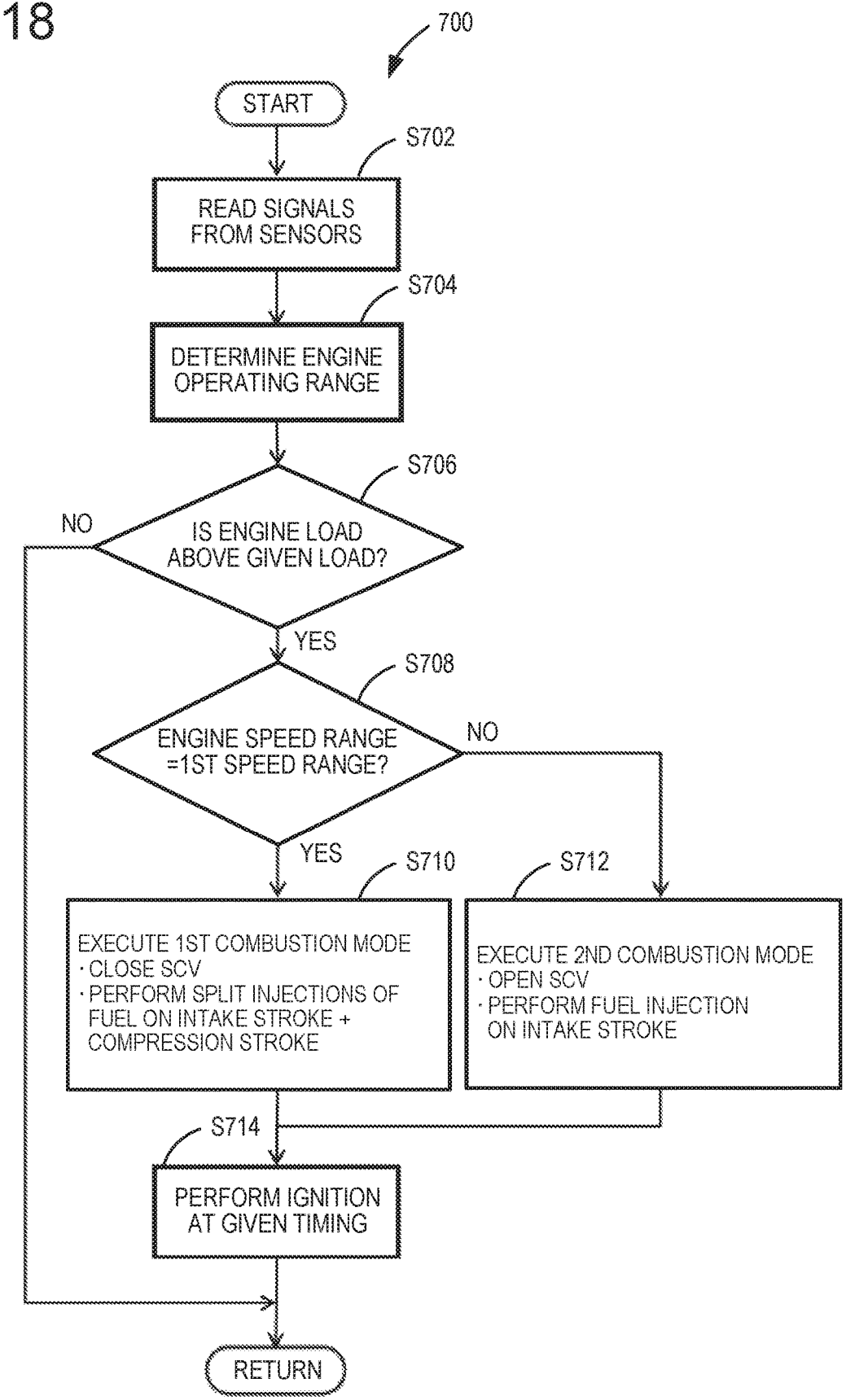
FIG. 18 is a flowchart illustrating a portion of FIG. 15.

FIG. 18 illustrates a method 700 executed by the ECU 10 for operation control of the engine 1. The following description of the method 700 is provided with reference to the software and hardware components described above and shown in FIGS. 1-16. It will be appreciated that the method 700 also may be performed in other contexts using other suitable hardware and software components.

With reference to FIG. 18, at S702 the method 700 includes reading signals from the sensors SW1 to SW16. At S704, the engine operating range is determined. At S706, it is determined whether or not the engine load is above a given load. If the engine load is determined to be above a given load, the method 700 proceeds to S708; otherwise the method 700 returns to S702 to read signals from sensors. At S708, it is determined whether or not the engine speed range is within the first speed range. When it is determined that the engine speed range is within the first speed range, the method 700 proceeds to S710, where the first combustion mode is executed. Otherwise, when it is determined that the engine speed range is not within the first speed range, the method proceeds to S712, where the second combustion mode is executed. In the first combustion mode, the SCV is closed, and split injections are performed of fuel on intake stroke and compression stroke. In the second combustion mode, the SCV is opened, and fuel injection is performed on intake stroke. At S714, ignition is performed at a given timing, and the method 700 returns to S702 to read signals from sensors.

Other Embodiments

Note that the art disclosed here is not limited to the application to the engine 1 having the above configuration. The configuration of the engine 1 may adopt various configurations.

Further, the engine 1 may include a turbocharger instead of the mechanical booster 44.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Control Unit)
17 Combustion Chamber
171 Squish Area
25 Spark Plug
3 Piston
31 Cavity
401 Primary Passage (First Intake Passage)
402 Secondary Passage (Second Intake Passage)
56 Swirl Control Valve (Swirl Generating Part)
6 Injector

What is claimed is:

1. A control system for a pre-mixture compression-ignition engine, comprising:
an engine formed with a combustion chamber and provided with an intake port opening into the combustion chamber, the intake port comprising a first intake port and a second intake port opening to the combustion chamber, a first intake passage connected to the first intake port and a second intake passage connected to the second intake port;
a spark plug disposed in a center portion of the combustion chamber;
a fuel injection valve configured to spray fuel disposed to be oriented into the combustion chamber;
a swirl generating part configured to generate a swirl flow in a circumferential direction in an outer circumferential portion of the combustion chamber located around the center portion, by a flow of intake air from the intake port, the swirl generating part disposed in the second intake passage and having a swirl control valve configured to throttle the second intake passage; and
a control unit connected to the spark plug, the fuel injection valve, and the swirl generating part and configured to output a control signal to the spark plug, the fuel injection valve, and the swirl generating part, respectively,
wherein the control unit includes:
a processor configured to execute:
an operating range determining module to determine an operating range of the engine; and
a combustion mode selecting module to select one of a first combustion mode in which SPCCI (SPark Controlled Compression Ignition) combustion in which SI combustion where a mixture gas formed in the combustion chamber combusts by flame propagation starts and CI combustion where an unburned mixture gas combusts by compression ignition is then performed, and a second combustion mode in which only the SI combustion is performed by the flame propagation,
wherein, when the combustion mode selecting module selects the first combustion mode, the control signal is outputted to the fuel injection valve to have a fuel amount within the mixture gas in the outer circumferential portion larger than a fuel amount within the mixture gas in the center portion so that a fuel concentration of the mixture gas in the outer circumferential portion of the combustion chamber becomes higher than a fuel concentration of the mixture gas in the center portion, the control signal is outputted to the swirl generating part so as to generate the swirl flow in the outer circumferential portion, and the control signal is outputted to the spark plug so as to ignite the mixture gas in the center portion,
wherein, when the combustion mode selecting module selects the second combustion mode, the control signal is outputted to the fuel injection valve so as to start the fuel injection on intake stroke so that the mixture gas is formed in the entire combustion chamber, the control signal is outputted to the swirl generating part so that the swirl flow becomes weaker than when the first combustion mode is selected, and the control signal is outputted to the spark plug so as to ignite the mixture gas before a top dead center of compression stroke,
wherein, when the operating range determining module determines that an engine load is in a highest load range higher than a given load and an engine speed is in a first speed range higher than a first given speed and lower than a second given speed, the combustion mode selecting module selects the first combustion mode,
wherein, when the operating range determining module determines that the engine load is in the highest load range and the engine speed is in a second speed range higher than the second given speed, the combustion mode selecting module selects the second combustion mode, wherein, when the operating range determining module determines that the operating range of the engine is within the first speed range, the control unit outputs the control signal to the swirl control valve to have a smaller opening than when the operating range of the engine is determined to be within the second speed range, and wherein the first speed range is a medium speed range and the second speed range is a high speed range when an entire operating range of the engine is divided into a low speed range, the medium speed range, and the high speed range.

2. The control system of claim 1, wherein, when the operating range determining module determines that the operating range of the engine is within the first speed range, the control unit outputs the control signal to the fuel injection valve so that a first injection is performed in a period from the intake stroke to an early half of the compression stroke so as to form the mixture gas for the CI combustion in the outer circumferential portion, and a second injection is performed on the compression stroke so as to form mixture gas for the SI combustion in the center portion.

3. The control system of claim 1, wherein, when the operating range determining module determines that the operating range of the engine is within one of the first speed range and the second speed range, the control unit outputs the control signal to the fuel injection valve so that a fuel concentration of the mixture gas of the entire combustion chamber has an excess air ratio of 1 or below.

4. The control system of claim 1, wherein, when the operating range determining module determines that the operating range of the engine is within the second speed range, the control unit outputs the control signal to the fuel injection valve so that a crank angle period in which the fuel is injected becomes longer than that when the operating range of the engine is determined to be within the first speed range.

5. The control system of claim 1, wherein a geometric compression ratio of the engine is between 13:1 and 20:1.

6. The control system of claim 1, wherein the given load is an engine load at which combustion pressure is 900 kPa, and the highest load range is a range in which the combustion pressure is above 900 kPa.

* * * * *